(12) United States Patent
Honmura et al.

(10) Patent No.: US 9,551,538 B2
(45) Date of Patent: Jan. 24, 2017

(54) SHEET-TYPE HEAT PIPE AND MOBILE TERMINAL USING THE SAME

(71) Applicant: Toshiba Home Technology Corporation, Niigata (JP)

(72) Inventors: Osamu Honmura, Niigata (JP); Nobuyuki Kojima, Niigata (JP); Naoto Sakuma, Niigata (JP)

(73) Assignee: TOSHIBA HOME TECHNOLOGY CORPORATION, Niigata (JP)

( * ) Notice: Subject to any disclaimer, the term of this patent is extended or adjusted under 35 U.S.C. 154(b) by 202 days.

(21) Appl. No.: 14/477,436

(22) Filed: Sep. 4, 2014

(65) Prior Publication Data

US 2015/0077929 A1    Mar. 19, 2015

(30) Foreign Application Priority Data

Sep. 18, 2013    (JP) .................. 2013-193474

(51) Int. Cl.
*F28D 15/02*    (2006.01)
*G06F 1/20*    (2006.01)
*F28D 15/04*    (2006.01)

(52) U.S. Cl.
CPC ......... *F28D 15/0233* (2013.01); *F28D 15/046* (2013.01); *G06F 1/203* (2013.01); *F28D 15/0266* (2013.01)

(58) Field of Classification Search
CPC .. H01L 23/427; H01L 23/473; F28D 15/0233; F28D 15/046; F28D 2021/0029; F28D 15/0283; F28D 15/04; F28D 15/02; F28D 15/043; F28D 15/025; Y10T 29/49353; Y10T 29/49366; F28F 2013/006; F28F 2245/02; G06F 1/203; G06F 1/20; G06F 2200/201; G06F 1/1635; H05K 7/20336; H05K 1/0203; H05K 1/0204; H05K 1/0206; H05K 2201/09036; H05K 2201/09981; H05K 7/20254; H05K 7/20272; H05K 7/20381; H05K 7/20445; B23P 15/26; B23P 2700/09; B23P 2700/10; B60H 1/00007; B23K 20/02
See application file for complete search history.

(56) References Cited

U.S. PATENT DOCUMENTS 5,560,423 A * 10/1996 Larson ................ F28D 15/0241
                                                   165/104.26
6,158,502 A    12/2000 Thomas
(Continued)

FOREIGN PATENT DOCUMENTS

CN    102135385    7/2011
JP    2000130972    5/2000
(Continued)

*Primary Examiner* — Courtney Smith
*Assistant Examiner* — Michael Matey
(74) *Attorney, Agent, or Firm* — Duane Morris LLP; J. Rodman Steele, Jr.; Gregory M. Lefkowitz

(57) ABSTRACT

Provided is a sheet-type heat pipe that has a sufficient heat transport capability and can be effortlessly installed in a thin chassis. The sheet-type heat pipe is made of a sealed container having a thickness of not larger than 0.5 mm. This container is formed by stacking and diffusion-joining together etched sheet bodies. Particularly, etching is performed on one side surface of each of the sheet bodies such that fine concavities and convexities can be formed on the inner surface of the container and the sheet-type heat pipe with a sufficient heat transport capability can thus be obtained even when the thickness of the container is not larger than 0.5 mm. More particularly, since the thickness of the container is formed to not larger than 0.5 mm, the sheet-type heat pipe can be effortlessly installed in a thin chassis such as that of a mobile terminal.

20 Claims, 40 Drawing Sheets

(56) References Cited

U.S. PATENT DOCUMENTS

| | | | |
|---|---|---|---|
| 6,466,441 B1 | 10/2002 | Suzuki | |
| 6,863,118 B1 | 3/2005 | Wang et al. | |
| 7,051,793 B1 | 5/2006 | Schulz-Harder | |
| 2002/0056542 A1* | 5/2002 | Yamamoto | F28D 15/0233 165/80.3 |
| 2004/0069460 A1* | 4/2004 | Sasaki | F28D 15/0241 165/104.26 |
| 2005/0022978 A1* | 2/2005 | Duval | F28D 15/0233 165/104.26 |
| 2007/0068657 A1* | 3/2007 | Yamamoto | F28D 15/0233 165/104.26 |
| 2008/0141872 A1* | 6/2008 | Jeng | B21C 37/08 100/35 |
| 2009/0025910 A1* | 1/2009 | Hoffman | F28D 15/046 165/104.26 |
| 2010/0157534 A1 | 6/2010 | Oniki et al. | |
| 2010/0220439 A1* | 9/2010 | Qin | G06F 1/203 361/679.47 |
| 2011/0310312 A1 | 12/2011 | Yokote et al. | |
| 2012/0186784 A1* | 7/2012 | Yang | F28D 15/0266 165/104.21 |
| 2014/0360701 A1* | 12/2014 | Aoki | H01L 23/427 165/104.21 |

FOREIGN PATENT DOCUMENTS

| | | | |
|---|---|---|---|
| JP | 2001505644 | 4/2001 | |
| JP | 2001230578 | 8/2001 | |
| JP | 2003075082 | 3/2003 | |
| JP | 2003235127 | 8/2003 | |
| JP | 2004037001 | 2/2004 | |
| JP | 2006526128 | 11/2006 | |
| JP | 2007183021 | 7/2007 | |
| JP | 2007212028 | 8/2007 | |
| JP | 2009139005 | 6/2009 | |
| JP | 2010144518 | 7/2010 | |
| JP | 2010267945 | 11/2010 | |
| JP | 2011-007365 | 1/2011 | |
| JP | A-2012-186692 | 9/2012 | |
| JP | 5180385 | 4/2013 | |
| JP | 2013174376 | 9/2013 | |
| KR | 20010079337 | 12/2001 | |
| KR | 20090094521 | 9/2009 | |
| WO | 2010/121230 | 10/2010 | |
| WO | WO 2013125427 A1 * | 8/2013 | H01L 23/427 |

* cited by examiner (Section A)

(Section C)

(Section E)

(Section B)

(Section D)

(Section F)

(Section G)

(Section H)

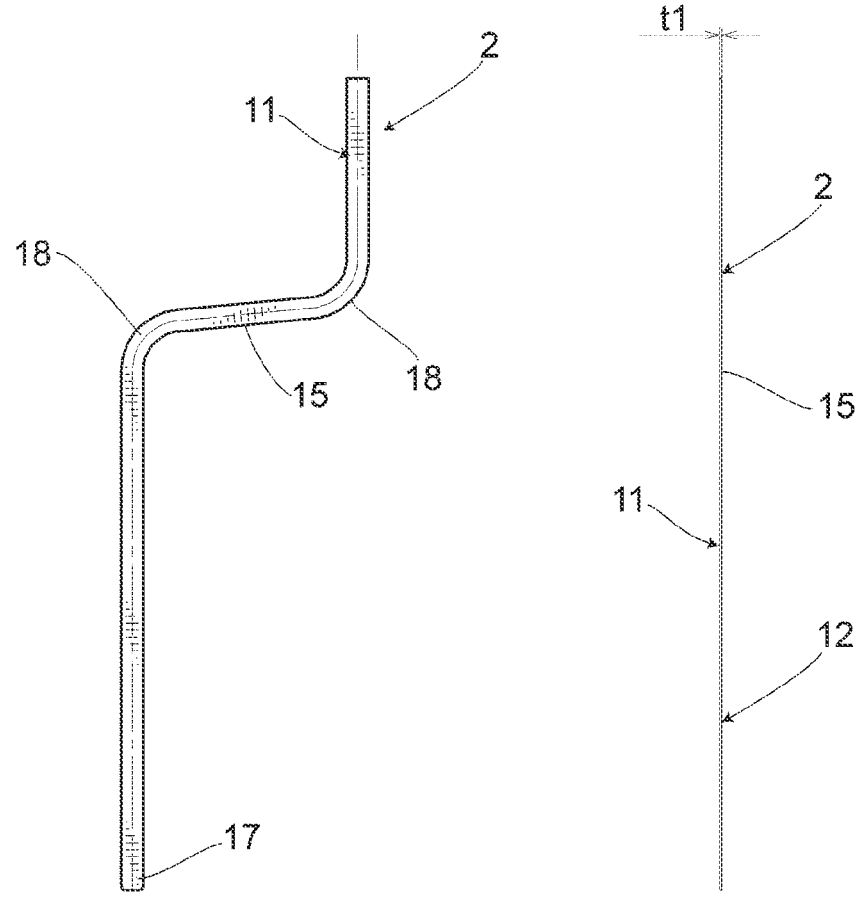

(Section A)

(Section B)

(Section C)

(Section A)

(Section C)

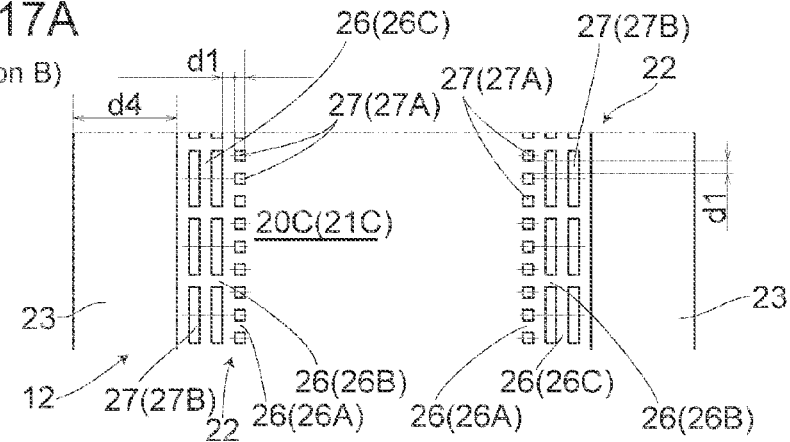
FIG.17A (Section B)
FIG.17B (Section D)

(Section E)

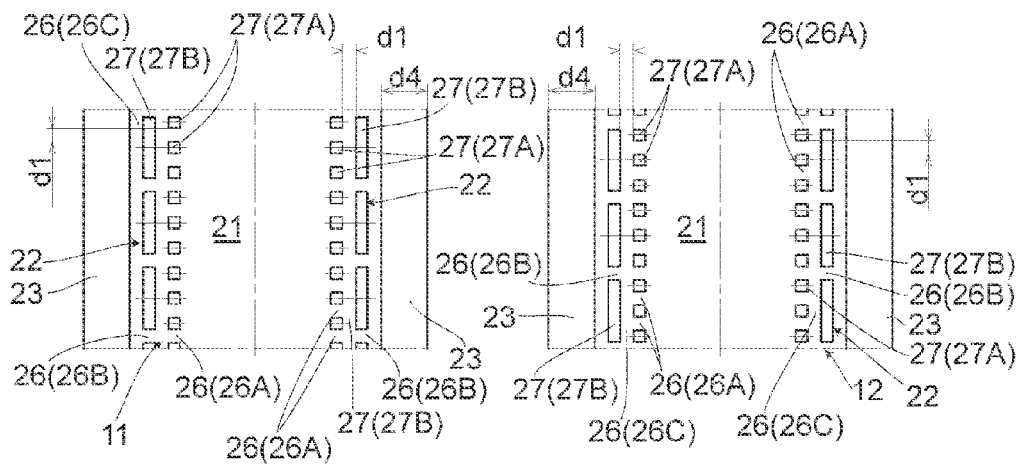
FIG.23A
(Section A)
FIG.23B
(Section B)
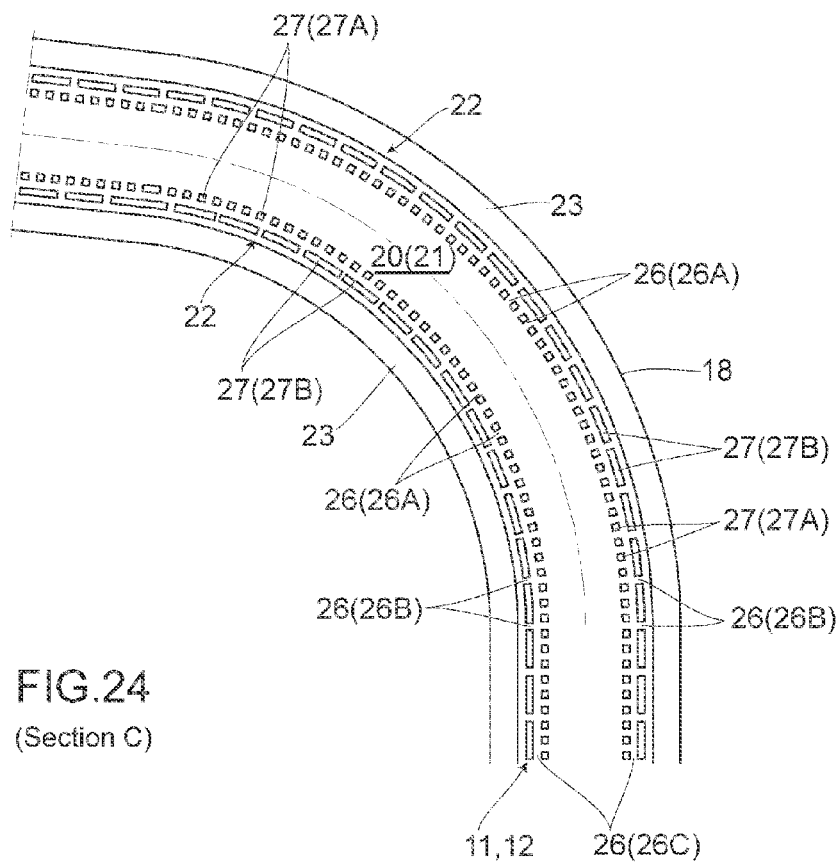
FIG.24
(Section C)

(Section D)

(Section E)

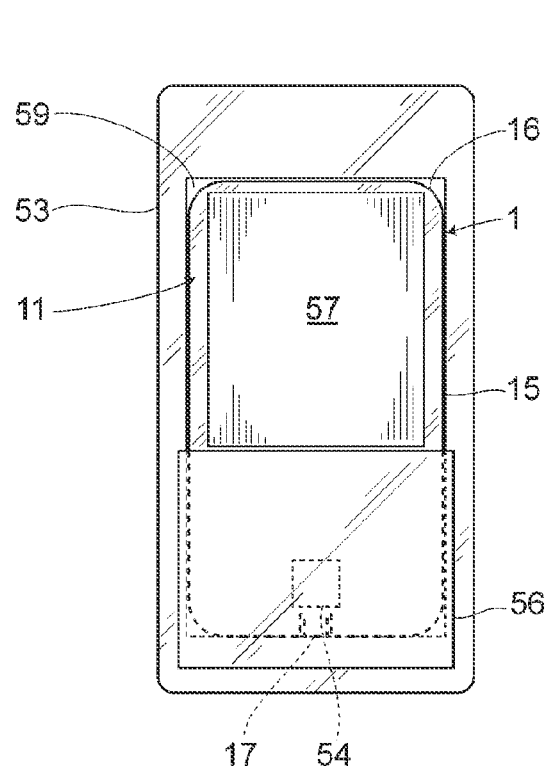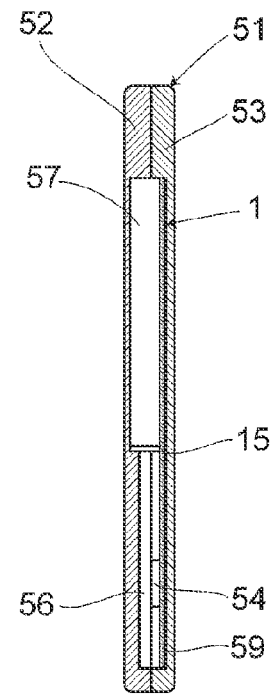
FIG.32A    FIG.32B
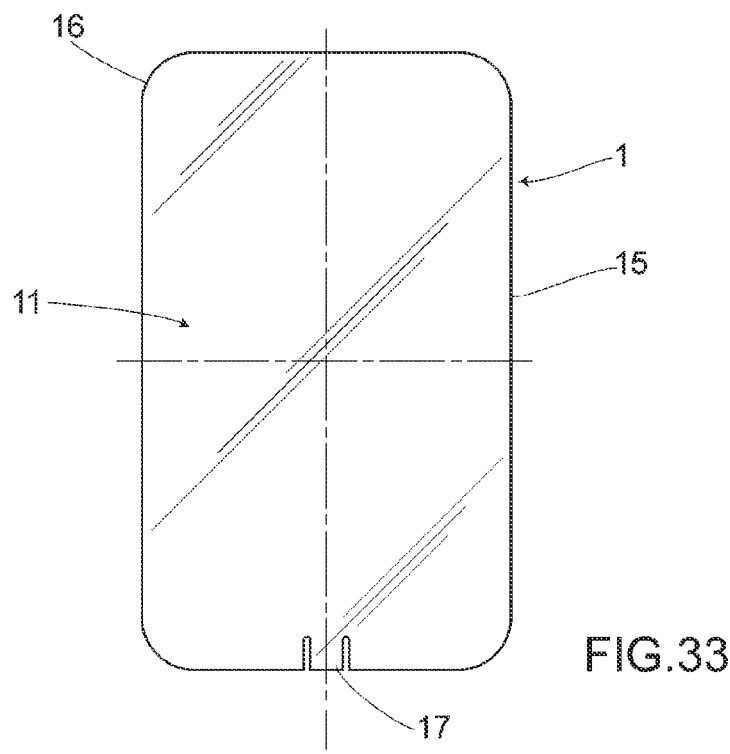
FIG.33

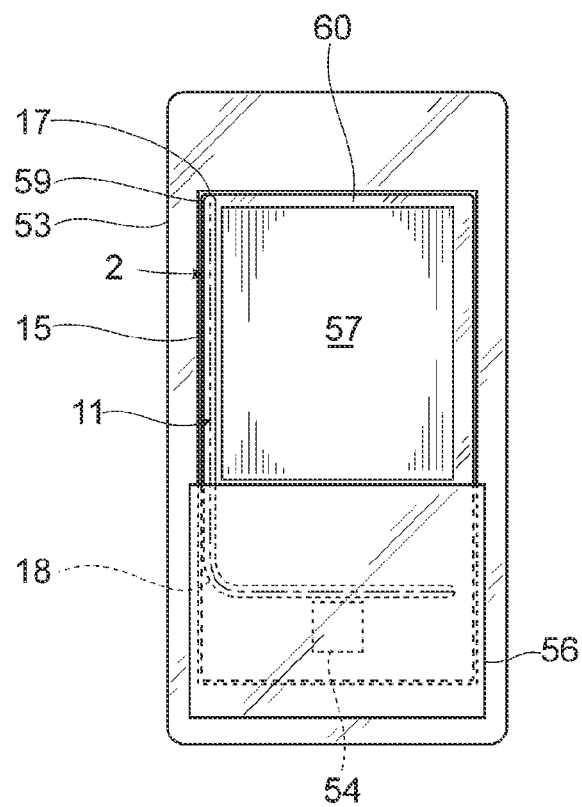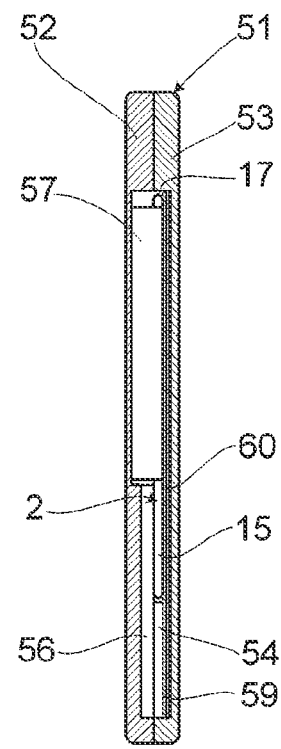
FIG.34A   FIG.34B
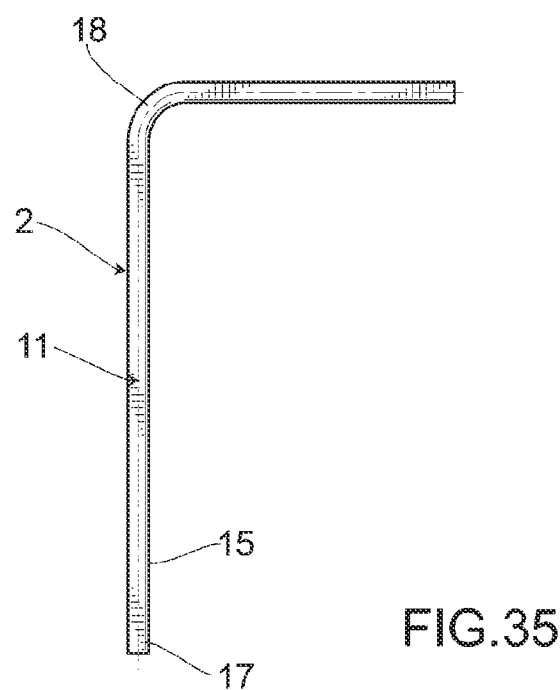
FIG.35

| Outer frame temperature | Full surface-type SHP (BC1) | | Local-type SHP (BC3) +copper plate | | Graphite sheet | |
|---|---|---|---|---|---|---|
| | Touch panel | Chassis rear surface | Touch panel | Chassis rear surface | Touch panel | Chassis rear surface |
| | Max.51.9°C | Max.47.2°C | Max.53.6°C | Max.45.1°C | Max.70.9°C | Max.50.4°C |
| Heat source temperature | 70.8°C | | 72.2°C | | 107.6°C | |
| Installation method | (diagram with 1, 51, 53, 16, 15, 11, 72, 71) | | (diagram with 51, 53, 16, 3, 15, 60, 11, 18, 19, 71) | | (diagram with 51, 53, 73, 71) | |
| Test condition: Ambient temperature 25°C, Amount of heat generated by heat source: 5W, Time elapsed: After 20 min | | | | | | |
| Limit thickness (reference) | t0.4 | | t0.4+0.2 | | t0.017 | |
| Merit | Integral cooling portion, irregular shape applicable | | Integral CPU heat receiving portion, irregular shape applicable | | — | |
| Thermal performance | Panel Δ19K/Heat source Δ36.8K | | Δ17.3K/Δ35.4K | | (Reference) | |

FIG.37

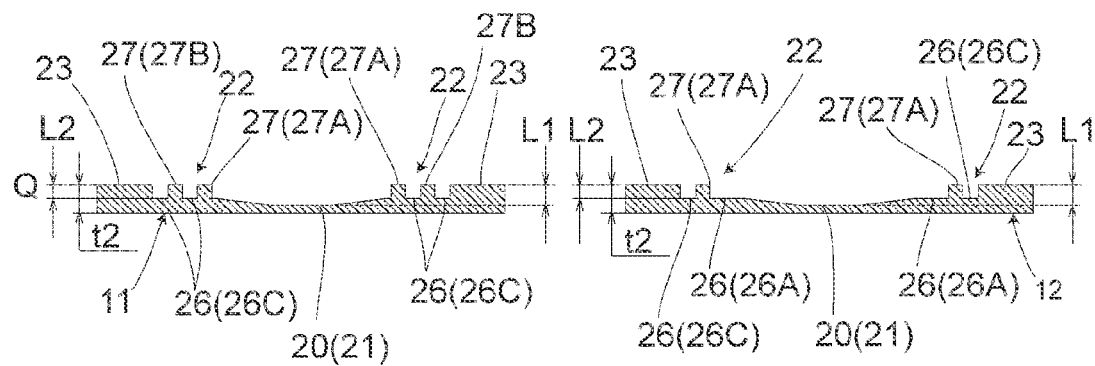
FIG.38A
D-D cross-section
FIG.38B
E-E cross-section
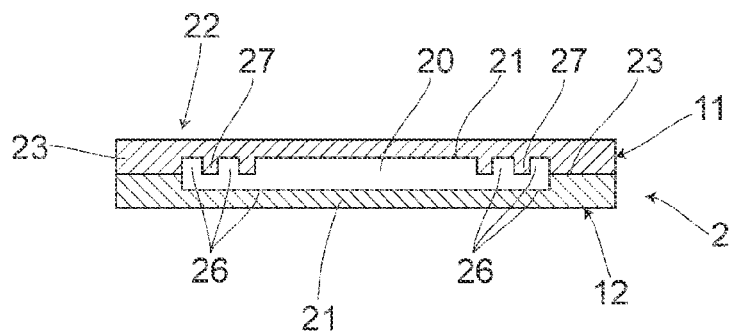
FIG.39

SHEET-TYPE HEAT PIPE AND MOBILE TERMINAL USING THE SAME

CROSS-REFERENCE TO RELATED APPLICATIONS

This application claims priority to Japanese Patent Application No. 2013-193474, filed Sep. 18, 2013, the entire contents of which are incorporated herein by reference.

BACKGROUND OF THE INVENTION

Field of the Invention

The present invention relates to a sheet-type heat pipe that is small but brings about a sufficient amount of heat transport; and a mobile terminal such as a smartphone or tablet terminal in which this sheet-type heat pipe is installed.

Description of Related Art

Conventionally, in order to diffuse a heat generated by a CPU installed in a mobile device such as a tablet terminal, there has been proposed, for example, a heat dissipation structure disclosed in JP-A-2012-186692. This heat dissipation structure is characterized by mixing into a heat dissipation sheet a graphite having a high thermal conductivity.

SUMMARY OF THE INVENTION

However, the conventional structure has failed to bring about a sufficient heat diffusion such that the temperature of a CPU sometimes surpassed a restrictive temperature, and that a heat spot(s) occurred on an outer frame of the mobile device. Therefore, it has been imperative to control the heat generation of the CPU. That is, it has been impossible to make best use of the capabilities of the CPU.

Meanwhile, there has also been known a heat dissipation structure for diffusing the heat generated by a CPU through a heat pipe. However, due to the restriction of a preferred size of a mobile device such as a tablet terminal, it is difficult to secure a space inside a chassis of the mobile device that is large enough to receive a heat pipe having a diameter of not smaller than $\phi$ 3 mm. Especially, as for a mobile terminal such as a smartphone, the thickness of its chassis is restricted for ease of use, which makes it difficult to install the heat pipe. Further, a pipe-shaped heat pipe is incapable of performing a favorable heat diffusion in a wide region of the mobile terminal, thus making it impossible for the mobile terminal to take full advantage of a heat-generating component such as the CPU.

In view of the aforementioned problems, it is an object of the present invention to provide a sheet-type heat pipe that has a sufficient heat transport capability and can be effortlessly installed in a thin chassis.

Further, it is also an object of the present invention to provide a mobile terminal capable of taking full advantage of the capabilities of a heat generating component such as a CPU.

Furthermore, it is also an object of the present invention to provide a sheet-type heat pipe that can be installed in a thin chassis and exhibits a further improved performance.

A sheet-type heat pipe of the present invention is configured as a container formed by stacking and joining together at least two etched metal sheets. This container is sealed by joining at least a part of the outer circumferential portion thereof.

Further, a mobile terminal of the present invention is so configured that the aforementioned thin sheet-type heat pipe is installed inside the chassis thereof.

Furthermore, the sheet-type heat pipe of the present invention is configured in a manner such that an inner space of the container as a heat receiving portion is partially filled with an unwoven cloth made of a metal fiber.

Furthermore, the sheet-type heat pipe of the present invention is configured in a manner such that each of the metal sheets includes a ditched section as a vapor passage that is formed through etching and has a depth not smaller than 50% of the thickness of each metal sheet.

Furthermore, the sheet-type heat pipe of the present invention is configured in a manner such that, as for each metal sheet, a ditched depth of a vapor passage is formed larger than a ditched depth of grooves as wicks through etching.

According to the invention of a first aspect, etching is performed on the surfaces of the metal sheets, and the container is sealed by joining at least a part of the outer circumferential portion thereof. For this reason, fine concavities and convexities can be formed on the inner surface of the container, and thus there can be obtained a thin sheet-type heat pipe having a sufficient heat transport capability even when the thickness of the sealed container is formed small. Moreover, since the container is formed thin, the sheet-type heat pipe can be effortlessly installed in a thin chassis such as that of a mobile terminal.

According to the invention of a second aspect, by performing etching on the surface of each metal sheet having a thickness of 0.05 mm to 0.3 mm, there can be formed on the inner surface of the container a fine vapor passage and wicks having a sufficient heat transport capability. Further, when stacking and joining together metal sheets of a thickness of 0.05 mm to 0.3 mm, preferably 0.1 mm to 0.2 mm, a manufacturability can be improved by performing diffusion joining especially.

According to the invention of a third aspect, by performing half-etching on the surface of each metal sheet, there can be formed on the inner surface of the container a fine vapor passage and wicks having a sufficient heat transport capability.

According to the invention of a fourth aspect, the vapor passage becomes narrow when the container is formed extremely thin i.e. to a thickness of not larger than 0.5 mm. For this reason, fine first grooves are disposed on the side regions of the vapor passage such that an operating fluid condensed inside the container shall not clog the vapor passage; and the number of the first grooves is larger than that of second grooves for the purpose of miniaturization. Thus, an absorption capability of the first grooves to absorb the operating fluid is improved, thereby improving the performance of the sheet-type heat pipe.

According to the invention of a fifth aspect, grooves formed on one metal sheet and grooves formed on the other metal sheet are arranged in a staggered manner against one another, thereby allowing the wicks to be finely miniaturized such that a capillary force is strengthened, thus improving the performance of the sheet-type heat pipe.

According to the invention of a sixth aspect, grooves formed on one metal sheet are blocked by the other metal sheet, thereby allowing the wicks to be finely miniaturized such that the capillary force is strengthened, thus improving the performance of the sheet-type heat pipe.

According to the invention of a seventh aspect, diffusion joining can be performed in a favorable manner when a width of a side wall of each metal sheet that forms the outer circumferential portion of the container is formed to not smaller than 0.3 mm, thus making it possible to provide a sheet-type heat pipe with a high reliability in sealing the container.

According to the invention of an eighth aspect, since there are formed second walls as a part of the wicks and a width of each second wall is not smaller than 0.25 mm, these second walls can be utilized to diffusion-join together the metal sheets at where the wicks are formed, thereby maintaining a sufficient strength even in the case of a thin sheet-type heat pipe.

According to the invention of a ninth aspect, grooves composing the wicks are formed to a width of 0.05 mm to 0.3 mm, thereby strengthening the capillary force of the wicks, thus improving the performance of the sheet-type heat pipe.

According to the invention of a tenth aspect, since the vapor passages are communicated with one another regardless of where a heat receiving portion and a heat dissipation portion are located in the sheet-type heat pipe, a thermal uniformity can be achieved in the entire area of the sheet-type heat pipe.

According to the invention of an eleventh aspect, the aforementioned thin sheet-type heat pipe can be installed in a thin chassis of a mobile terminal, thereby allowing heat diffusion to take place in a favorable manner in a wide region of the chassis, thus making it possible to take full advantage of the capabilities of a heat generating component such as a CPU.

According to the invention of a twelfth aspect, the heat transported by the sheet-type heat pipe is swiftly diffused in a wide region of a chassis, thus allowing heat diffusion to take place in a favorable manner in approximately the entire region of the chassis. For this reason, a heat spot(s) occurring on a touch panel can be alleviated while taking full advantage of the capabilities of a heat generating component such as a CPU.

According to the invention of a thirteenth aspect, an attachment portion(s) are formed on the sheet-type heat pipe for the purpose of attaching the sheet-type heat pipe to a chassis. That is, the attachment portion(s) are utilized to easily attach the sheet-type heat pipe to the chassis.

According to the invention of a fourteenth aspect, the sheet-type heat pipe can be installed inside a chassis without interfering with a battery pack or a functional component, thus making it possible to easily form a mobile terminal thin.

According to the invention of a fifteenth aspect, a heat dissipation plate allows heat diffusion to take place in a favorable manner inside a chassis regardless of the shape of the sheet-type heat pipe, thus leading to an improvement in the performance of a heat generating component such as a CPU.

According to the invention of a sixteenth aspect, a heat receiving portion of the sheet-type heat pipe is disposed in a lateral section of a heat source in a way such that the heat receiving portion occupies at least 50% of a peripheral region of the heat source. Therefore, the heat from the heat source can be effectively and thermally transported by the sheet-type heat pipe, thereby allowing heat diffusion to take place in a favorable manner inside a chassis, thus leading to an improvement in the performance of a heat generating component such as a CPU.

According to the invention of a seventeenth aspect, the sheet-type heat pipe formed to a thickness of not larger than 0.5 mm can be installed in a chassis of a thinner mobile terminal, thus allowing the mobile terminal to be easily formed thin.

According to the invention of an eighteenth aspect, etching is performed on the surface of each metal sheet. In this way, even when the sealed container is formed thin, fine concavities and convexities can be formed on the inner surface of the container. Thus, there can be obtained a thin sheet-type heat pipe having a sufficient heat transport capability, and this sheet-type heat pipe can also be installed in a thin chassis such as that of a mobile terminal. In addition, the wicks of the heat receiving portion as a part of the container are further finely miniaturized by an unwoven cloth loaded therein, thus leading to an improvement in the performance of the sheet-type heat pipe.

According to the invention of a nineteenth aspect, half-etching is performed on the surface of each metal sheet such that there can be formed on the inner surface of the container the fine vapor passage and wicks having a sufficient heat transport capability. Further, when the thickness of the container is formed to not larger than 0.5 mm, the sheet-type heat pipe can be effortlessly installed even in a thin chassis such as that of a mobile terminal.

According to the invention of a twentieth aspect, etching is performed on the surface of each metal sheet. In this way, even when the sealed container is formed thin, fine concavities and convexities can be formed on the inner surface of the container. Thus, there can be obtained a thin sheet-type heat pipe having a sufficient heat transport capability, and this sheet-type heat pipe can be installed in a thin chassis such as that of a mobile terminal. Further, a ditched section having a depth not smaller than 50% of the thickness of each metal sheet is formed as the vapor passage through etching. Thus, even when the sheet-type heat pipe is formed thin, an adequate vapor passage can be secured inside the container, thus leading to an improvement in the performance of the sheet-type heat pipe.

According to the invention of a twenty-first aspect, etching is performed on the surface of each metal sheet. In this way, even when the sealed container is formed thin, fine concavities and convexities can be formed on the inner surface of the container. Thus, there can be obtained a thin sheet-type heat pipe having a sufficient heat transport capability, and this sheet-type heat pipe can be installed in a thin chassis such as that of a mobile terminal. Further, a ditched depth of the vapor passage is formed larger than a ditched depth of grooves as the wicks of each metal sheet through etching. Therefore, even when the sheet-type heat pipe is formed thin, an adequate vapor passage can be secured inside the container, and fine wicks can be formed therein, thus leading to an improvement in the performance of the sheet-type heat pipe.

BRIEF DESCRIPTION OF THE DRAWINGS

FIG. 8A is a planar view of a completed sheet-type heat pipe of a second embodiment of the invention.

FIG. 8B is a side view of the completed sheet-type heat pipe of the second embodiment of the invention.

FIG. 17A is a detailed enlarged view of a section B shown in FIG. 15A.

FIG. 17B is a detailed enlarged view of a section D shown in FIG. 15A.

FIG. 23A is a detailed enlarged view of a section A shown in FIG. 20B.

FIG. 23B is a detailed enlarged view of a section B shown in FIG. 21A.

FIG. 24 is a detailed enlarged view of a section C shown in FIG. 20B and FIG. 21A.

FIG. 32A is a rear view of the smartphone without a rear cover but with the sheet-type heat pipe of the first embodiment installed therein.

FIG. 32B is a vertical cross-sectional view of the smartphone with the rear cover and with the sheet-type heat pipe of the first embodiment installed therein.

FIG. 33 is a planar view of the sheet-type heat pipe of the first embodiment to be installed in the smartphone.

FIG. 34A is a rear view of the smartphone without the rear cover but with the sheet-type heat pipe of the second embodiment installed therein.

FIG. 34B is a vertical cross-sectional view of the smartphone with the rear cover and with the sheet-type heat pipe of the second embodiment installed therein.

FIG. 35 is a planar view of the sheet-type heat pipe of the second embodiment to be installed in the smartphone.

FIG. 37 is an explanatory diagram for comparing temperature increases of the mobile terminal with one another depending on a difference in a cooling structure.

FIG. 38A is a cross-sectional view taken on a line D-D shown in FIG. 11A.

FIG. 38B is a cross-sectional view taken on a line E-E shown in FIG. 11B.

FIG. 39 is a cross-sectional view of a modified embodiment of the sheet-type heat pipe of the second embodiment.

DETAILED DESCRIPTION OF THE INVENTION

Figure 1A:
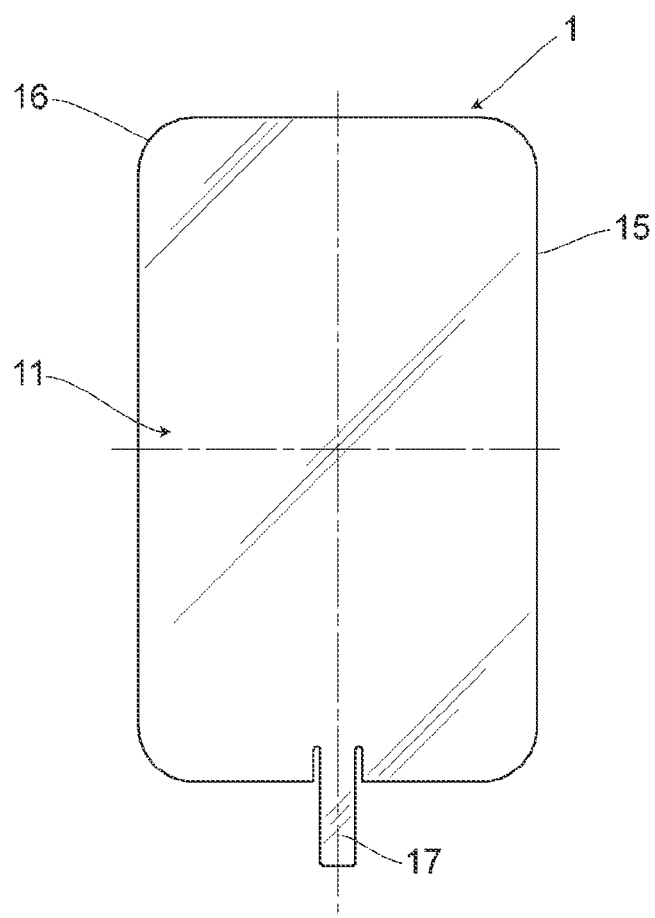
FIG. 1A is a planar view of a completed sheet-type heat pipe of a first embodiment of the invention.

Preferred embodiments of the present invention are described hereunder. Particularly, taken as an example is a sheet-type heat pipe that is installed in a mobile terminal such as a smartphone, a mobile phone or a tablet terminal. More particularly, four embodiments of the sheet-type heat pipe of the present invention are described beginning with basic structures thereof. As for certain embodiments, structural details and modifications thereof are later described along with functions and effects brought about thereby. Here, identical parts are denoted by identical symbols, and descriptions of identical structures, functions and effects are omitted as much as possible to avoid repetition.

First Embodiment

FIG. 1A to FIG. 7 show a sheet-type heat pipe 1 of a first embodiment of the present invention. As illustrated in each of the figures, the sheet-type heat pipe 1 is composed of a container 15 obtained by diffusion-joining a first sheet body 11 and a second sheet body 12 that are two copper foil sheets. As such sheet bodies 11 and 12, there may also be employed a sheet of another metal e.g. aluminum that has a favorable thermal conductivity and is capable of being etched. As shown in FIG. 1B, the sheet-type heat pipe 1 of a completed state is formed into the shape of a substantially rectangular plate, and has an outer shape matched to a chassis inner shape of a later-described mobile terminal 51 (see FIG. 31) such as a smartphone. Further, formed on four corners of the sheet-type heat pipe 1 of the completed state are chamfered portions 16 having round shapes. Furthermore, a tube-shaped sealing portion 17 for welding is formed on the container 15 for the purpose of vacuum-encapsulating an operating fluid (not shown) such as pure water in the container 15. Here, a thickness t1 of the container 15 sealed by the scaling portion 17, i.e. a thickness of the sheet-type heat pipe 1 is 0.4 mm.

Figures 2A, 2B:
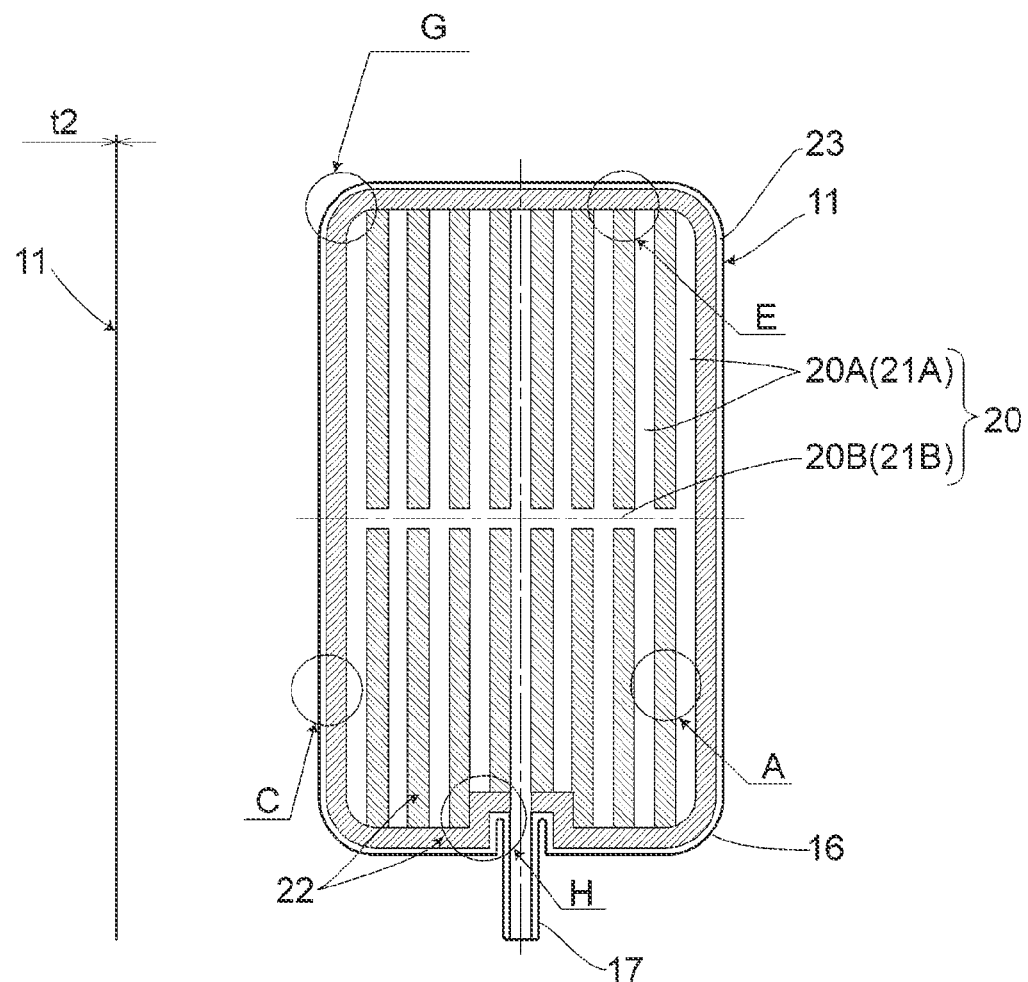
FIG. 2A is a side view of a first sheet body of the first embodiment of the invention.
FIG. 2B is a planar view of the first sheet body of the first embodiment of the invention.
Figures 3A, 3B:
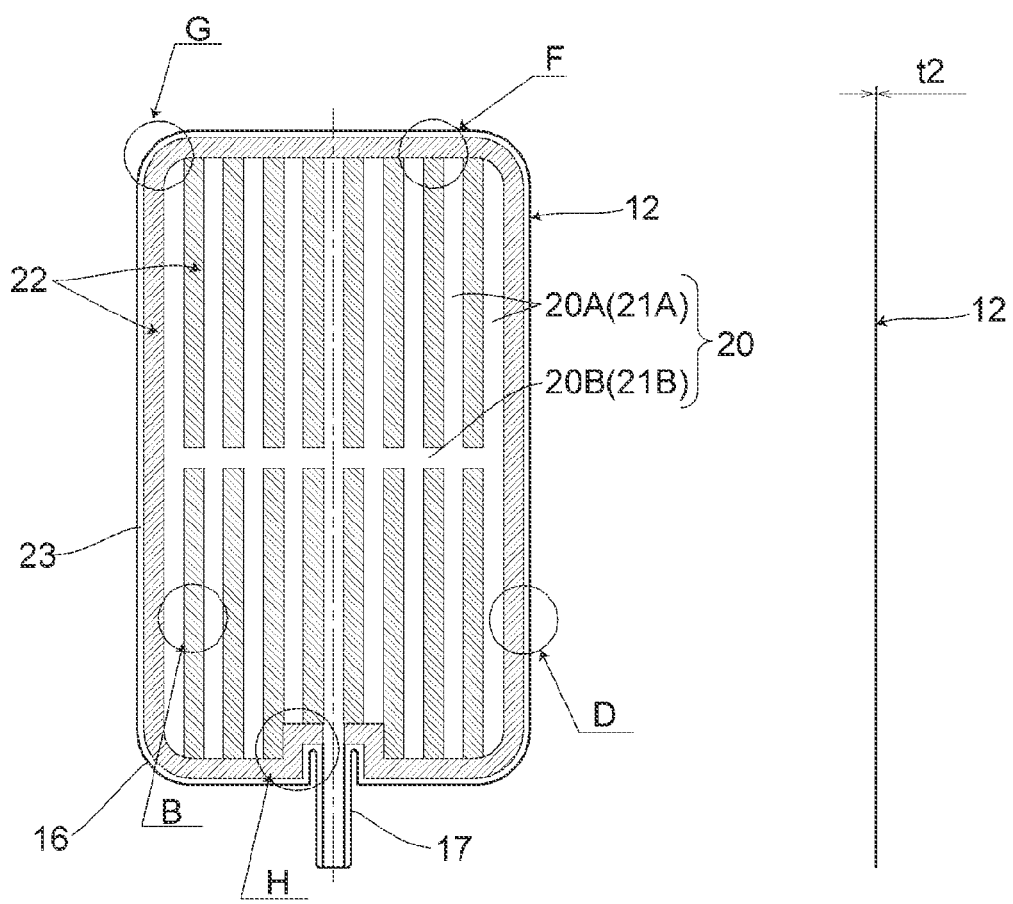
FIG. 3A is a planar view of a second sheet body of the first embodiment of the invention.
FIG. 3B is a side view of the second sheet body of the first embodiment of the invention.

FIGS. 2A and 2B and FIGS. 3A and 3B show the first sheet body 11 and the second sheet body 12, respectively. A thickness t2 of each of the sheet bodies 11 and 12 is 0.2 mm. Exclusively provided on one side surface of each of the sheet bodies 11 and 12 that eventually serves as the inner surface of the container 15, are a vapor passage 20 and wicks 22 which are formed through half-etching, i.e. etching is performed midway through the thickness of each of the sheet bodies 11 and 12. Particularly, the vapor passage 20 serves to transport to a heat dissipation portion a vapor generated from the operating fluid at a heat receiving portion, and the wicks 22 serve to reflux to the heat receiving portion the operating fluid condensed at the heat dissipation portion. Other than the vapor passage 20 and the wicks 22, further provided on the one side surface of each of the sheet bodies 11 and 12 is an unetched side wall 23 formed along an outer circumference of each of the sheet bodies 11 and 12. In fact, the side walls 23 of the sheet bodies 11 and 12 are formed in locations where the side walls 23 are allowed to lie on top of each other when the one side surfaces of the sheet bodies 11 and 12 face each other. Eventually, the side walls 23 become a part of the outer circumferential portion of the container 15 through diffusion joining. In FIG. 2B and FIG. 3A, the wicks 22 are shown as the shaded areas.

When forming the vapor passages 20 and the wicks 22 on the sheet bodies 11 and 12 through photo-etching, it is required that each of the sheet bodies 11 and 12 has a thickness t2 of not smaller than 0.05 mm. It is difficult to install the sheet-type heat pipe 1 in the mobile terminal 51 having a unique shape, when the thickness t2 of each of the sheet bodies 11 and 12 is larger than 0.3 mm, i.e. the thickness t1 of the container 15 (eventually the sheet-type heat pipe 1) is larger than 0.5 mm. Therefore, as a result of etching the surfaces of the sheet bodies 11 and 12 having a thickness of 0.05 mm to 0.3 mm, and thus limiting the thickness t1 of the completed sheet-type heat pipe 1 to a thickness of not larger than 0.5 mm, not only the fine vapor passages 20 and wicks 22 with a sufficient heat transport capability can be formed on the inner surface of the container 15; but the sheet-type heat pipe 1 can be effortlessly installed in a thin chassis such as that of the mobile terminal 51.

Inside the sealed container 15, each vapor passage 20 of the first embodiment is composed of concave first passage sections 21A and a concave second passage section 21B. Particularly, a plurality of the first passage sections 21A are arranged along the longitudinal direction of the sheet-type heat pipe 1; and the second passage section 21B intersects and is communicated with each of the first passage sections 21A. Although the first passage sections 21A and the second passage section 21B are linear; and the first passage sections 21A and the second passage section 21B are orthogonal to one another in the central region of the sheet-type heat pipe 1, they may be formed into any shape and communicated with one another in any location. In the present embodiment, when laying the sheet bodies 11 and 12 on top of each other with the one side surfaces thereof facing each other, hollow tube-shaped first vapor paths 20A are formed as a result of allowing the first passage sections 21A of the sheet bodies 11 and 12 to face one another, and a hollow tube-shaped second vapor path 20B is formed as a result of allowing the second passage sections 21B to face each other. At that time, established inside the container 15 is the completed vapor passage 20 composed of the first vapor paths 20A and the second vapor path 20B. That is, the plurality of the first vapor paths 20A formed along the longitudinal direction of the sheet-type heat pipe 1, are now communicated with the single second vapor path 20B formed along the horizontal direction of the heat pipe 1. In addition, inside the container 15, the wicks 22 are now formed in locations other than where the vapor passage 20 and the side wall 23 are provided.

Figure 4A:
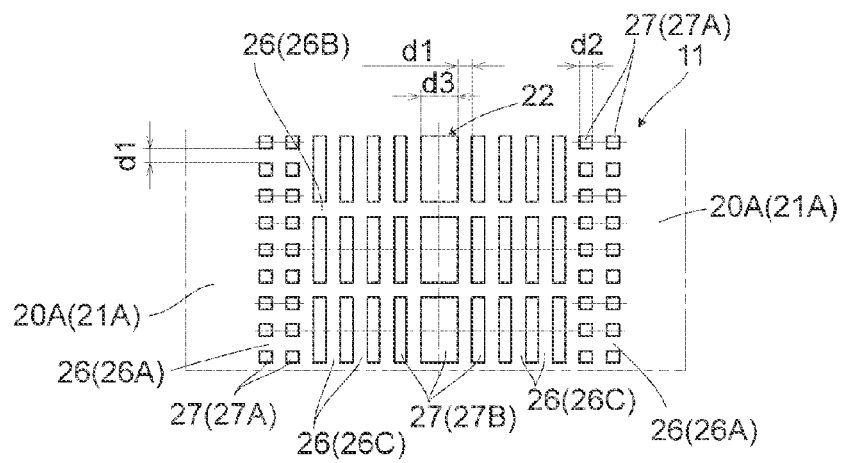
FIG. 4A is a detailed enlarged view of a section A shown in FIG. 2B.
Figure 4B:
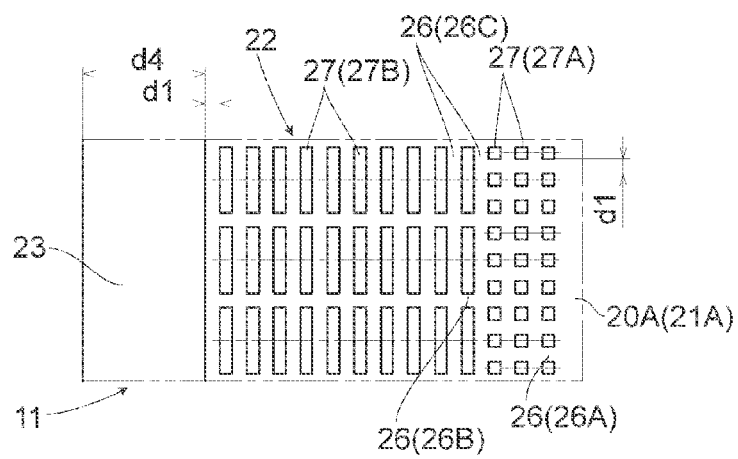
FIG. 4B is a detailed enlarged view of a section C shown in FIG. 2B.
Figure 4C:
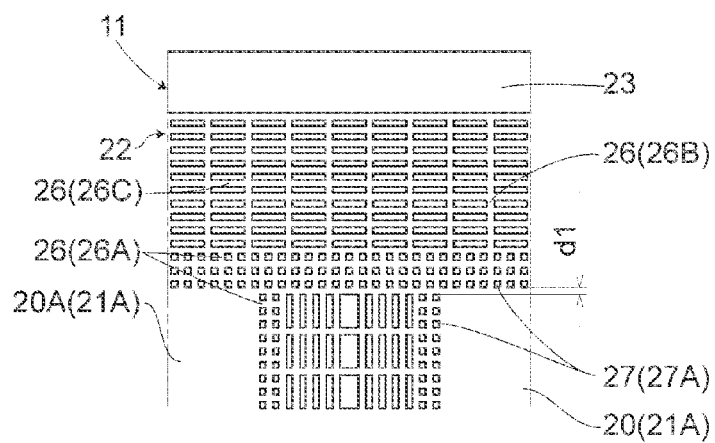
FIG. 4C is a detailed enlarged view of a section E shown in FIG. 2B.
Figure 5A:
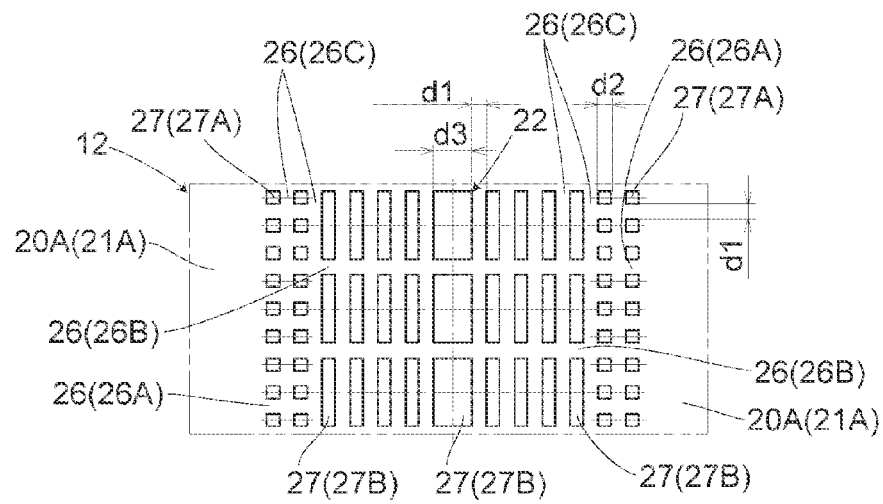
FIG. 5A is a detailed enlarged view of a section B shown in FIG. 3A.
Figure 5B:
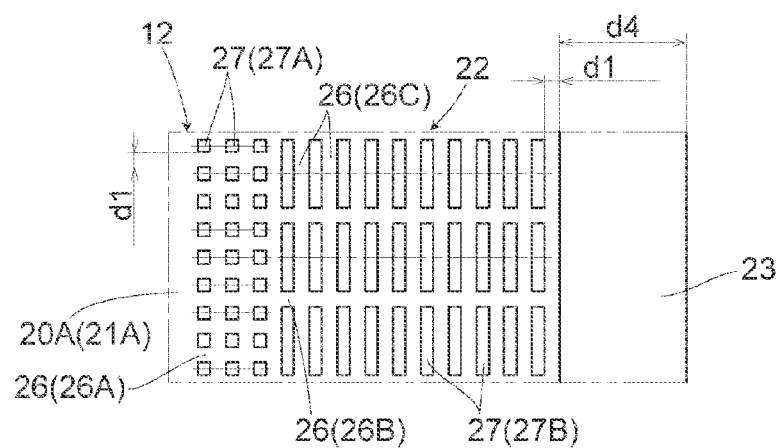
FIG. 5B is a detailed enlarged view of a section D shown in FIG. 3A.
Figure 5C:
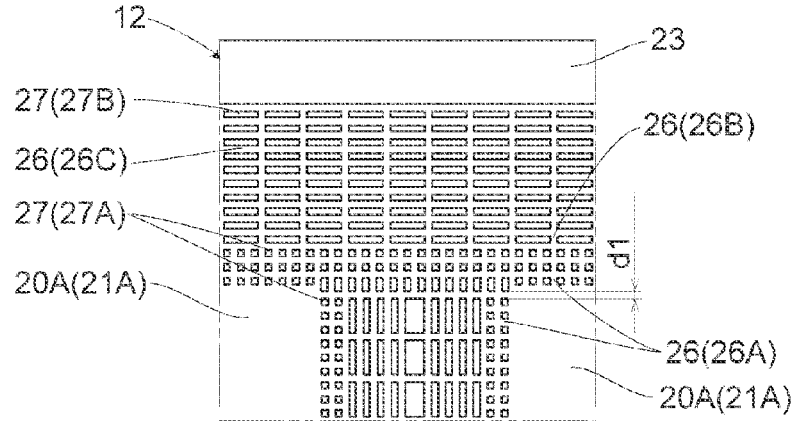
FIG. 5C is a detailed enlarged view of a section F shown in FIG. 3A.

FIG. 4A, FIG. 4B and FIG. 4C are enlarged views showing sections A, C and E, respectively, of the first sheet body 11 of FIG. 2B. Further. FIG. 5A, FIG. 5B and FIG. 5C are enlarged views showing sections B, D and F, respectively, of the second sheet body 12 of FIG. 3A. As shown in each of these views, the wicks 22 are composed of concave grooves 26 obtained through etching; and unetched walls 27. That is, in the regions of the wicks 22, a plurality of the grooves 26 serving as passages of the operating fluid are formed into desired shapes by the walls 27.

The grooves 26 are composed of first grooves 26A, second grooves 26B and third grooves 26C. Specifically, a plurality of the first grooves 26A are located along bilateral regions and end regions of the vapor passage 20, and are arranged at a given interval in a manner such that the first grooves 26A are formed orthogonal to the direction of the vapor passage 20. Further, the second grooves 26B of the number smaller than that of the first grooves 26A are formed more distant from the vapor passage 20 than the first grooves 26A, and are arranged at an interval larger than that of the first grooves 26A. Furthermore, the third grooves 26C serve to communicate these first grooves 26A and second grooves 26B with one another along the direction of the vapor passage 20. The depth of the grooves 26 is 0.1 mm to 0.13 mm. As for a width d1 of the grooves 26, each of the first grooves 26A, the second grooves 26B and the third grooves 26C has a width of 0.12 mm. Here, the capillarity of the wicks 22 can be improved when the width d1 of the grooves 26 is in a range of 0.05 mm to 0.3 mm. In addition, the number of the first grooves 26A provided is larger than that of the second grooves 26B, and the first grooves 26A finer than the second grooves 26B are located at the bilateral regions of and directly communicated with the vapor passage 20.

Meanwhile, the walls 27 formed among the grooves 26 are composed of at least a plurality of first walls 27A and a plurality of second walls 27B. Particularly, each of the first walls 27A has a width d2 that is as large as 0.1 mm and established along a direction orthogonal to the vapor passage 20, for the purpose of establishing the first grooves 26A at an interval smaller than that of the second grooves 26B. Further, the second walls 27B are provided to establish the second grooves 26B, and the shapes of the second walls 27B are different from those of the first walls 27A. As for several second walls 27B, a width d3 thereof along the direction orthogonal to the vapor passage 20 is formed to 0.3 mm which is larger than the width d2 of each first wall 27A. In the present embodiment, the plurality of the first walls 27A and the plurality of the second walls 27B are aligned together in a direction orthogonal to the direction of the vapor passage 20, and the side wall 23 is formed outside the wicks 22, thereby allowing the plurality of the third grooves 26C to be established thereamong at a given interval. Preferably, when the width d2 of each first wall 27A is smaller than 0.25 mm and the width d3 of each second wall 27B is not smaller than 0.25 mm, diffusion joining can be performed at where the wicks 22 are formed, with the second walls 27B of the sheet bodies 11 and 12 being laid on top of one another.

A width d4 of the side wall 23 is formed to 1 mm on the entire circumference of each of the sheet bodies 11 and 12. Preferably, the width d4 of the side wall 23 of each of the sheet bodies 11 and 12 that eventually becomes the outer circumferential portion of the container 15 is formed to at least not smaller than 0.3 mm. In this way, the sheet bodies 11 and 12 can be favorably diffusion-joined to each other at where the side walls 23 are formed, thus obtaining the sheet-type heat pipe 1 with a high reliability in sealing the container 15.

Figure 6:
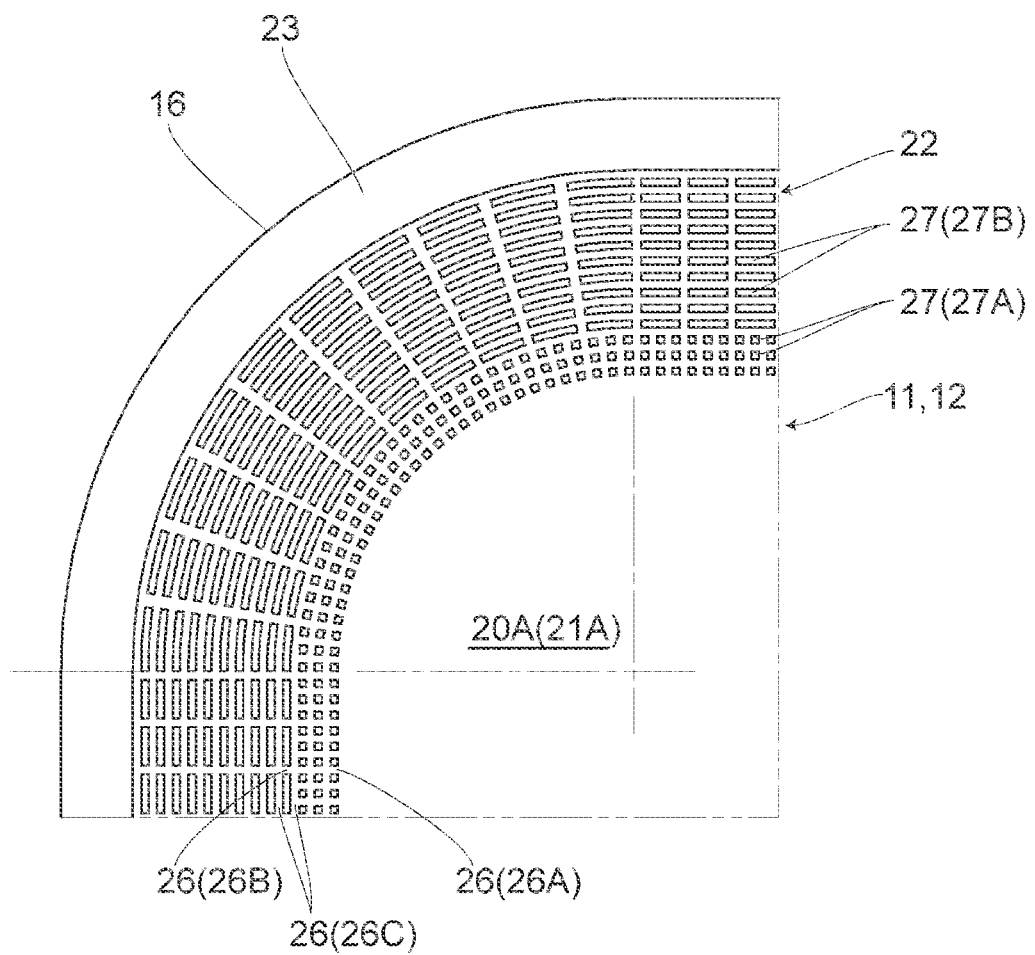
FIG. 6 is a detailed enlarged view of a section G shown in FIG. 2B and FIG. 3A.
Figure 7:
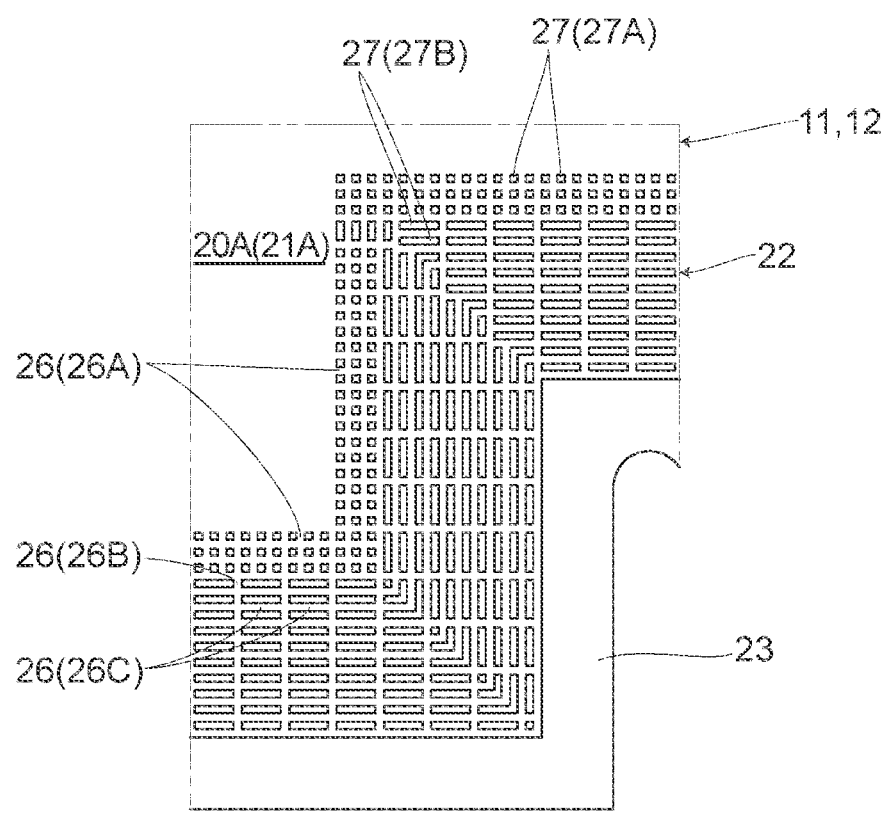
FIG. 7 is a detailed enlarged view of a section H shown in FIG. 2B and FIG. 3A.

FIG. 6 is an enlarged view showing a section G of each of the sheet bodies 11 and 12 of FIG. 2B and FIG. 3A. Further, FIG. 7 is an enlarged view showing a section H of each of the sheet bodies 11 and 12 of FIG. 2B and FIG. 3A. As shown in each of these views, the structure of the wicks 22 is likewise provided between the vapor passage 20 and the side wall 23 in the vicinity of the chamfered portions 16 and the sealing portion 17. Here, the width d1 of the grooves 26 is also formed to 0.12 mm.

Second Embodiment

FIG. 8A to FIG. 12 show a sheet-type heat pipe 2 of a second embodiment of the present invention. As shown in each of these figures, the sheet-type heat pipe 2 of this embodiment, as is the case for the first embodiment, is composed of the container 15 obtained by diffusion-joining together the two copper foil sheets which are the first sheet body 11 and the second sheet body 12. However, as shown in FIG. 8A and FIG. 8B, the sheet-type heat pipe 2 is formed into the shape of a thin and elongated planar stick as compared to the sheet-type heat pipe 1 of the first embodiment. Further, in consideration of the chassis inner structure of the mobile terminal 51, two bended portions 18 are formed on the sheet-type heat pipe 2 if necessary. In fact, no limitation is imposed on the number of the bended portions 18 as well as the angles at which they are bended. Particularly, the sheet-type heat pipe 2 may also be formed into a linear shape with no bended portion 18 being provided thereon. Moreover, the tube-shaped sealing portion 17 is formed at one end of the container 15 so that an operating fluid such as pure water can be vacuum-encapsulated inside the container 15. A thickness t1 of the container 15 sealed by the sealing portion 17, i.e. a thickness of the sheet-type heat pipe 2 is 0.4 mm.

FIG. 9A to FIG. 10B show the first sheet body 11 and the second sheet body 12, respectively. A thickness t2 of each of the sheet bodies 11 and 12 is 0.2 mm, and exclusively formed on a one side surface of each of the sheet bodies 11 and 12 through half-etching are the vapor passage 20, the wicks 22 and the side wall 23. In the present embodiment, the wicks 22 are provided on both sides of the vapor passage 20 that is unidirectionally extended along the outer shape of the sheet-type heat pipe 2, and the side wall 23 is formed outside the wicks 22. Specifically, the side walls 23 are provided in locations where the side walls 23 can be laid on top of each other when the one side surfaces of the sheet bodies 11 and 12 face each other. More specifically, the side walls 23 eventually form the outer circumferential portion of the container 15 through diffusion joining. Here, in FIG. 9B and FIG. 10A, the wicks 22 are shown as the shaded areas.

When forming the vapor passages 20 and the wicks 22 on the sheet bodies 11 and 12 through photo-etching, etching is performed on the surfaces of the sheet bodies 11 and 12 each having the thickness t2 of 0.05 mm to 0.3 mm, and the thickness t1 of the completed sheet-type heat pipe 2 is set to be not larger than 0.5 mm. Thus, there can be formed on the inner surface of the container 15 the fine vapor passage 20 and wicks 22 with a sufficient heat transport capability. In addition, the sheet-type heat pipe 2 can be effortlessly installed in a thin chassis such as that of the mobile terminal 51.

The vapor passage 20 of the second embodiment is composed of a concave passage section 21. This concave passage section 21 is established inside the sealed container 15 and is formed along the longitudinal direction of the sheet-type heat pipe 2. Particularly, the passage sections 21 of the sheet bodies 11 and 12 face each other to form a single hollow and tube-shaped vapor passage 20, as a result of laying the sheet bodies 11 and 12 on top of each other with the one side surfaces thereof facing each other. Here, the wicks 22 are formed at locations inside the container 15 where the vapor passage 20 and the side wall 23 are not provided.

Figures 9A, 9B:
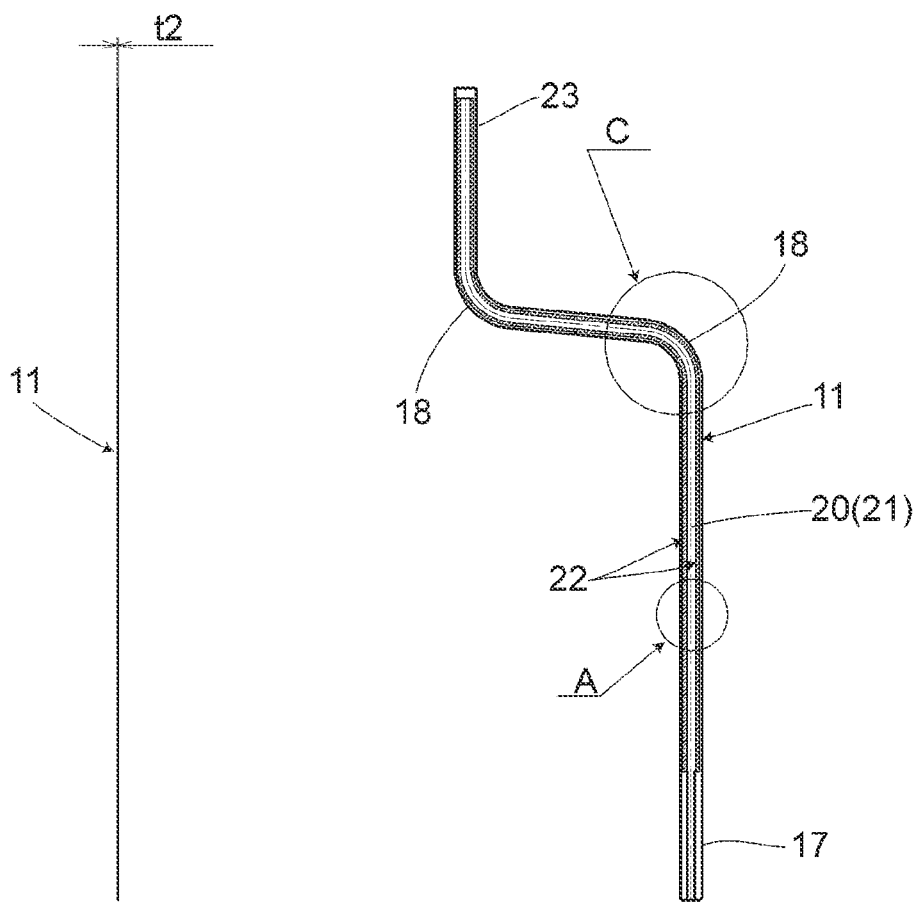
FIG. 9A is a side view of a first sheet body of the second embodiment of the invention.
FIG. 9B is a planar view of the first sheet body of the second embodiment of the invention.
Figures 10A, 10B:
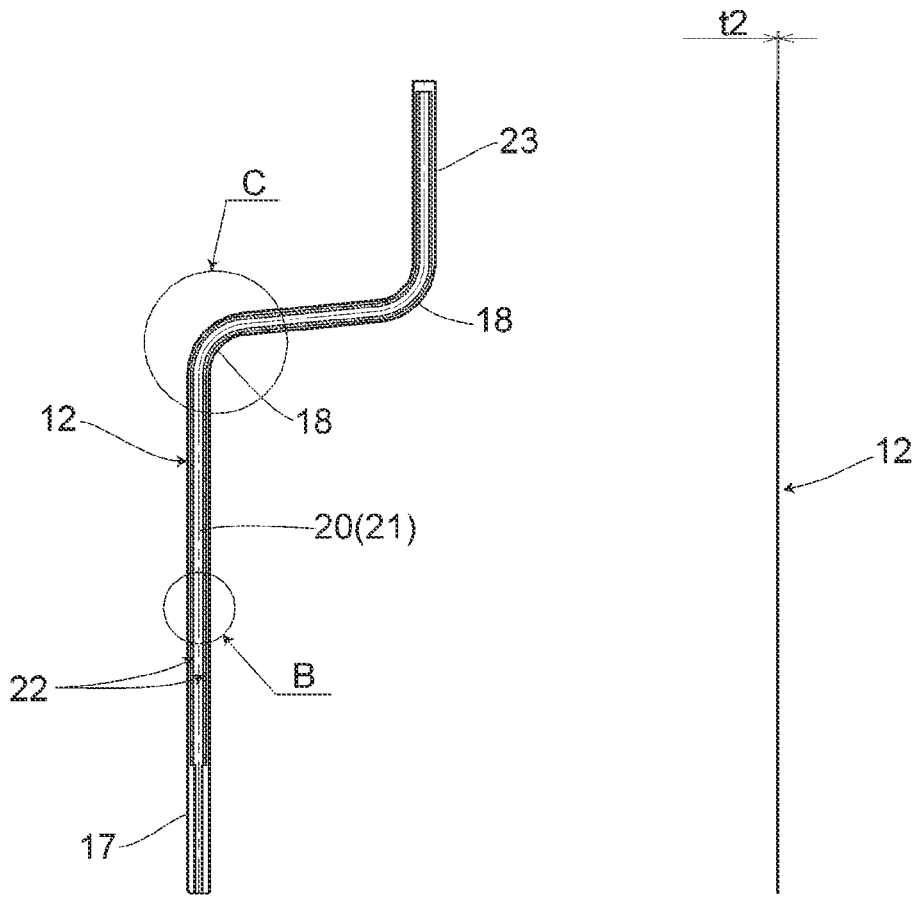
FIG. 10A is a planar view of a second sheet body of the second embodiment of the invention.
FIG. 10B is a side view of the second sheet body of the second embodiment of the invention.
Figures 11A, 11B:
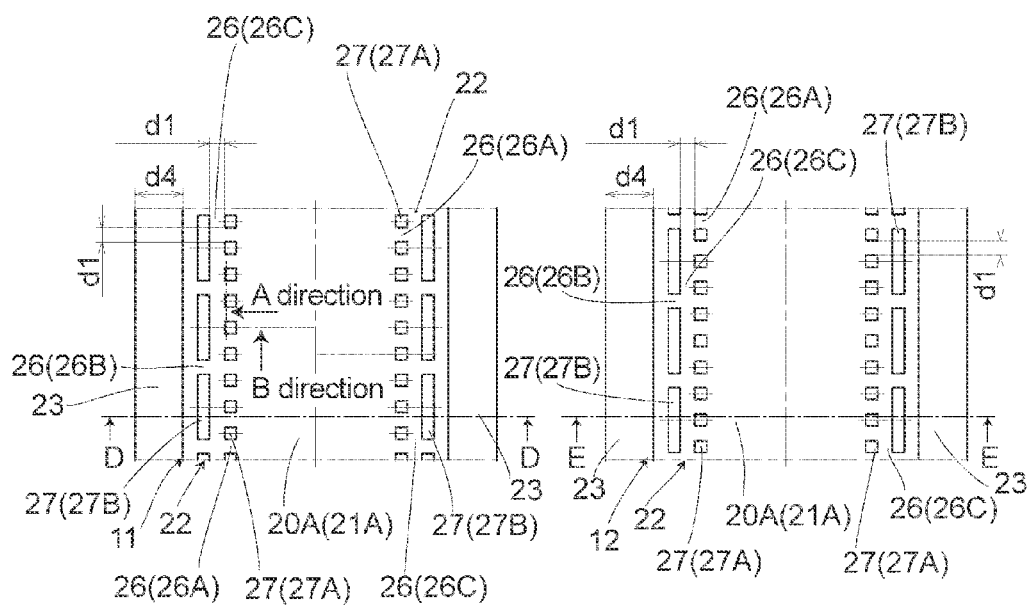
FIG. 11A is a detailed enlarged view of a section A shown in FIG. 9B.
FIG. 11B is a detailed enlarged view of a section B shown in FIG. 10A.

FIG. 11A is an enlarged view showing a section A of the first sheet body 11 of FIG. 9B; and FIG. 11B is an enlarged view showing a section B of the second sheet body 12 of FIG. 10A. Here, the wicks 22 are also composed of the concave grooves 26 formed through etching; and the unetched walls 27. Further, the plurality of the grooves 26 as passages of an operating fluid are established in the regions of the wicks 22, and are formed into desired shapes by the walls 27.

The grooves 26 are located along the bilateral regions and end regions of the vapor passage 20. As is the case with the first embodiment, the grooves 26 are composed of the first grooves 26A, the second grooves 26B and the third grooves 26C. The depth of the grooves 26 is 0.1 mm to 0.13 mm. As for a width d1 of the grooves 26, each of the first grooves 26A, the second grooves 26B and the third grooves 26C has a width of 0.12 mm. The number of the first grooves 26A provided is larger than the number of the second grooves 26B provided; and the first grooves 26A finer than the second grooves 26B are arranged on the bilateral regions of and directly communicated with the vapor passage 20.

A width d4 of the side wall 23 is formed to 0.4 mm on the entire circumference of each of the sheet bodies 11 and 12. That is, the sheet bodies 11 and 12 can be favorably diffusion-joined to each other at where the said walls 23 are formed, thus obtaining the sheet-type heat pipe 2 with a high reliability in sealing the container 15.

Figure 12:
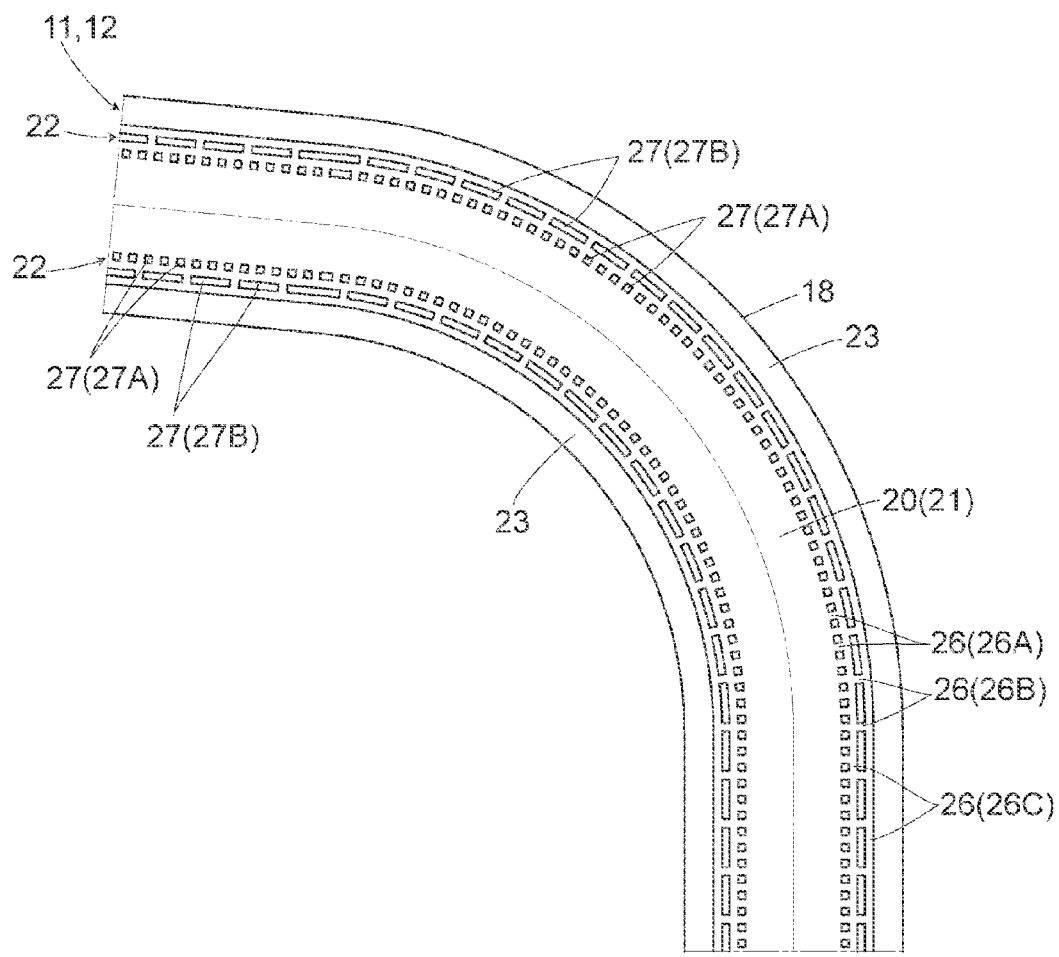
FIG. 12 is a detailed enlarged view of a section C shown in FIG. 9B and FIG. 10A.
Figure 13A:
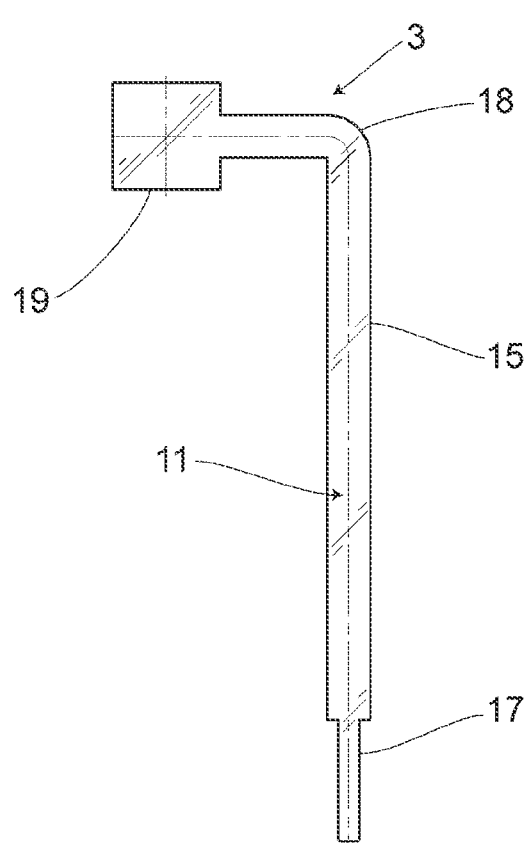
FIG. 13A is a planar view of a completed sheet-type heat pipe of a third embodiment of the invention.
Figure 13B:
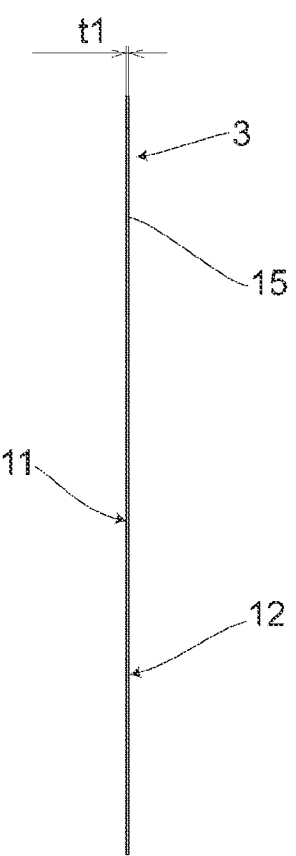
FIG. 13B is a side view of the completed sheet-type heat pipe of the third embodiment of the invention.

FIG. 12 is an enlarged view showing a section C of the sheet bodies 11 and 12 of FIG. 9B and FIG. 10A. As shown in FIG. 12, the aforementioned structure of the wicks 22 is likewise established between the vapor passage 20 and the side wall 23 even in the bended portions 18 of the sheet-type heat pipe 2. Here, the width d1 of the grooves 26 is also formed to 0.12 mm.

Third Embodiment

FIG. 13A to FIG. 18 show a sheet-type heat pipe 3 of a third embodiment of the present invention. As shown in each of these figures, the sheet-type heat pipe 3 of this embodiment is, as is the case with the second embodiment, composed of the container 15 obtained by diffusion-joining together the two copper foil sheets which are the first sheet body 11 and the second sheet body 12. Further, the sheet-type heat pipe 3 is formed into the shape of a thin and elongated planar stick as compared to the sheet-type heat pipe 1 of the first embodiment. Furthermore, in order to optimize a heat receiving capability with respect to a heat source such as a CPU, a heat receiving portion 19 matched to the outer shape of such CPU is formed on one end of the sheet-type heat pipe 3. This heat receiving portion 19 is formed wider than any other portions of the sheet-type heat pipe 3 in the planar view. Moreover, only one bended portion 18 is formed midway through the container 15 such that the sheet-type heat pipe 3 is substantially formed into the shape of "L" in the planar view. No limitation is imposed on the number of the bended portions 18 as well as the angles at which they are bended. In fact, the sheet-type heat pipe 3 may be formed into a linear shape with no bended portion 18 being provided thereon. Similarly, no limitation is imposed on the number of the heat receiving portions 19 and the shapes thereof. The tube-shaped sealing portion 17 is formed at one end of the container 15 so that an operating fluid such as pure water can be vacuum-encapsulated inside the container 15. A thickness t1 of the container 15 sealed by the sealing portion 17, i.e. a thickness of the sheet-type heat pipe 3 is 0.4 mm.

FIG. 14A to FIG. 15B show the first sheet body 11 and the second sheet body 12, respectively. A thickness t2 of each of the sheet bodies 11 and 12 is 0.2 mm, and exclusively formed on one side surface of each of the sheet bodies 11 and 12 through half-etching are the vapor passage 20, the wicks 22 and the side wall 23. In the present embodiment, the wicks 22 are provided on both sides of the vapor passage 20 that is unidirectionally extended along the outer shape of the sheet-type heat pipe 3, and the side wall 23 is arranged outside the wicks 22. Specifically, the side walls 23 are formed in locations where the side walls 23 are allowed to lie on top of each other when the one side surfaces of the sheet bodies 11 and 12 face each other. More specifically, the side walls 23 eventually form the outer circumferential portion of the container 15 through diffusion joining. Here, in FIG. 14B and FIG. 15A, the wicks 22 are shown as the shaded areas.

When forming the vapor passage 20 and the wicks 22 on the sheet bodies 11 and 12 through photo-etching, etching is performed on the surfaces of the sheet bodies 11 and 12 each having a thickness t2 of 0.05 mm to 0.3 mm, and the thickness t1 of the completed sheet-type heat pipe 3 is set to be not larger than 0.5 mm. Thus, there can be formed on the inner surface of the container 15 the fine vapor passage 20 and wicks 22 with a sufficient heat transport capability, and the sheet-type heat pipe 3 can be effortlessly installed in a thin chassis such as that of the mobile terminal 51.

The vapor passage 20 of the third embodiment is composed of the concave first passage sections 21A, a single concave second passage section 21B and a single concave third passage section 21C. Particularly, a plurality of the first passage sections 2A are aligned along a single direction of the wide heat receiving portion 19 inside the sealed container 15. Further, the second passage section 21B cuts across each of the first passage sections 21A in the heat receiving portion 19, and is communicated with these first passage sections 21A. Furthermore, the third passage section 21C is formed on a linear region between the heat receiving portion 19 and the scaling portion 17, and is communicated with the second passage section 21B. Although both the first passage sections 21A and the second passage section 21B are formed into linear shapes; and the first passage sections 21A and the second passage section 21B are orthogonal to one another at an end region of the heat receiving portion 19, the first passage sections 21A and the second passage section 21B may have any shapes and be communicated with one another in any locations. In the present embodiment, as a result of laying the sheet bodies 11 and 12 on top of each other with the one side surfaces thereof facing each other, the first passage sections 21A of the sheet bodies 11 and 12 face one another such that the hollow tube-shaped first vapor paths 20A can be formed; the second passage sections 21B of the sheet bodies 11 and 12 face each other such that the hollow tube-shaped second vapor path 20B can be formed; and the third passage sections 21C of the sheet bodies 11 and 12 face each other such that a hollow tube-shaped third vapor passage 20C can be formed. At that time, formed inside the container 15 is the vapor passage 20 composed of the first vapor paths 20A, the second vapor path 20B and the third vapor passage 20C that are communicated with one another. Further, inside the container 15, the wicks 22 are now formed in locations other than where the vapor passage 20 and the side wall 23 are provided.

Figures 14A, 14B:
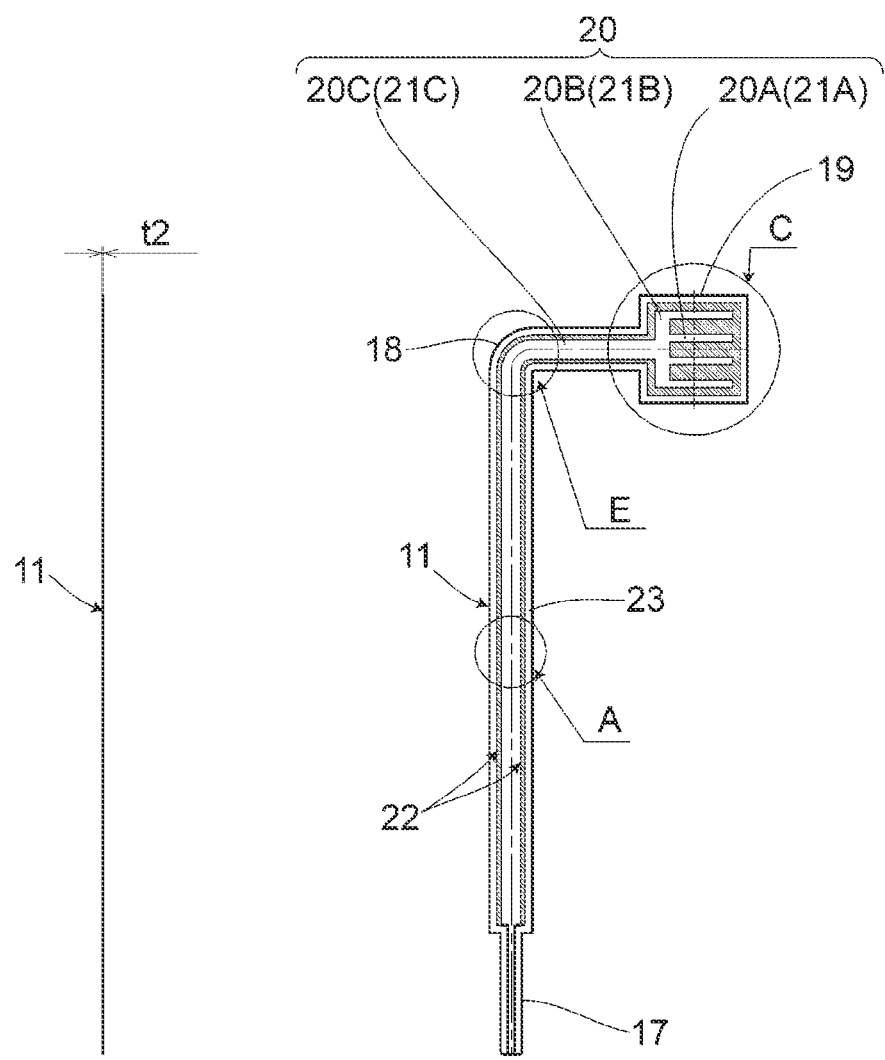
FIG. 14A is a side view of a first sheet body of the third embodiment of the invention.
FIG. 14B is a planar view of the first sheet body of the third embodiment of the invention.
Figures 15A, 15B:
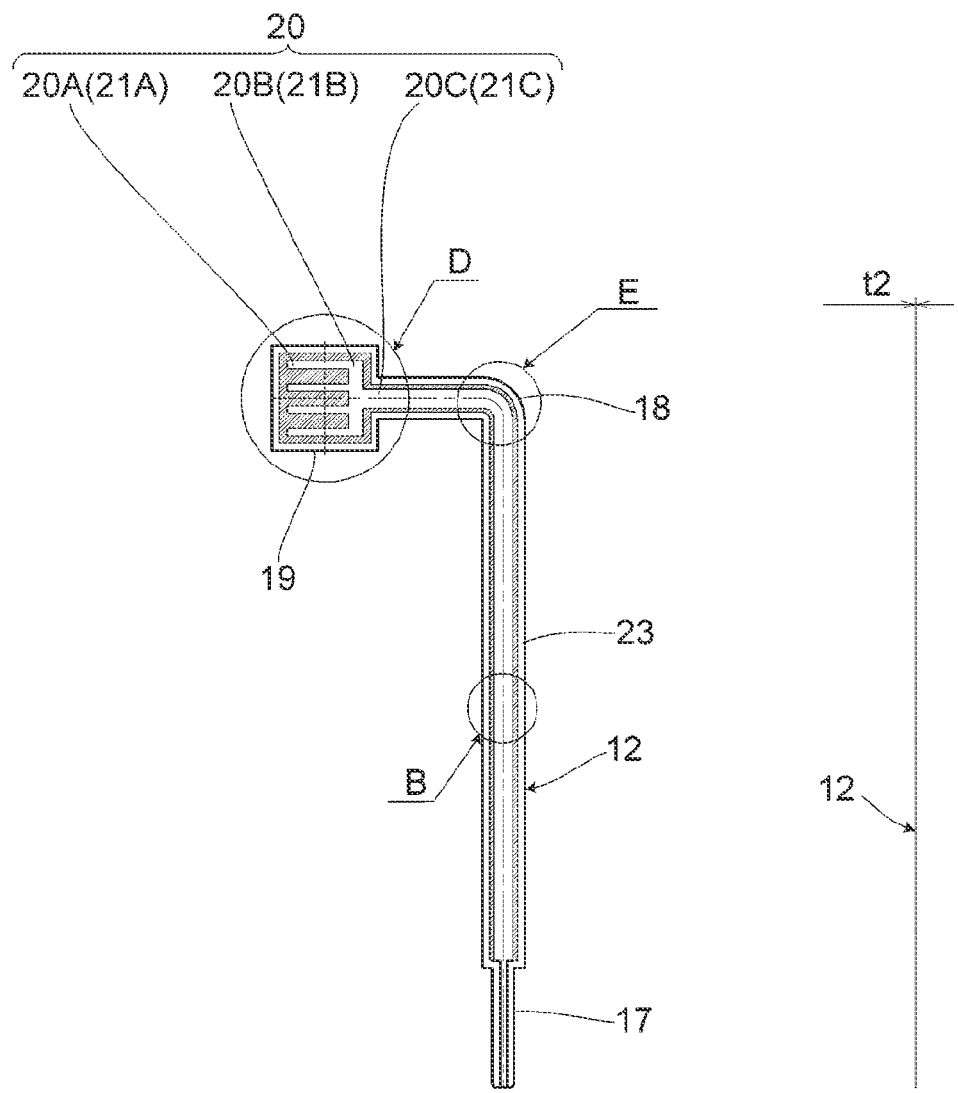
FIG. 15A is a planar view of a second sheet body of the third embodiment of the invention.
FIG. 15B is a side view of the second sheet body of the third embodiment of the invention.
Figure 16A:
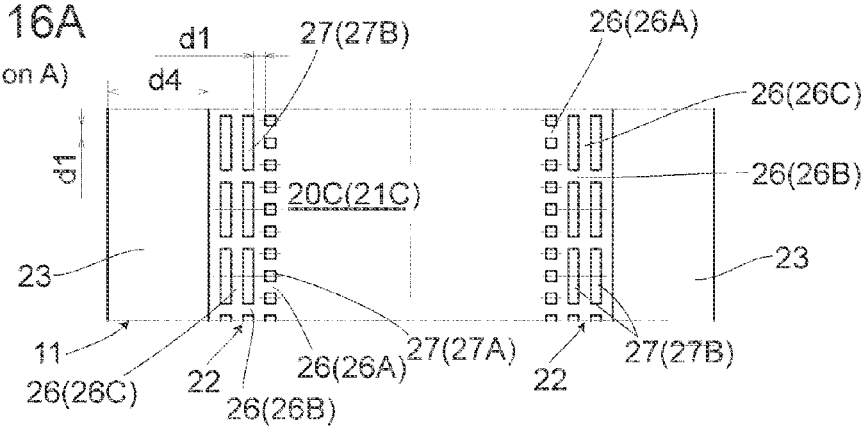
FIG. 16A is a detailed enlarged view of a section A shown in FIG. 14B.
Figure 16B:
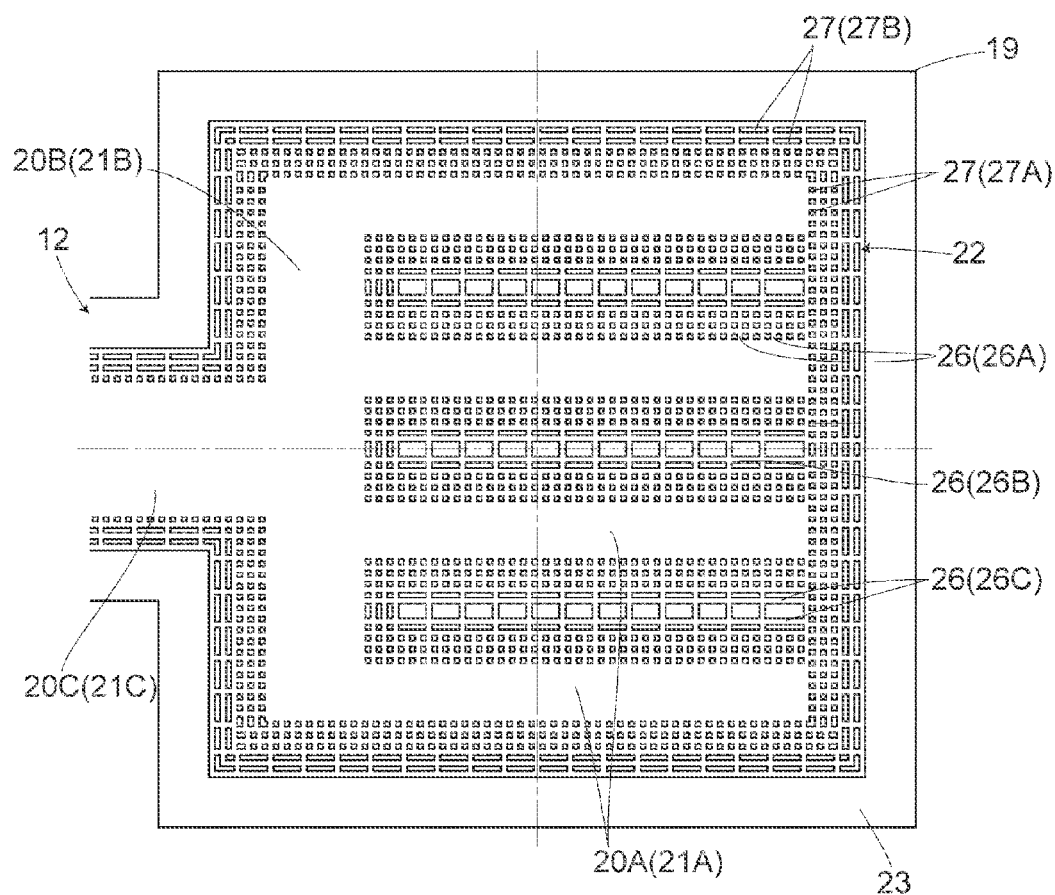
FIG. 16B is a detailed enlarged view of a section C shown in FIG. 14B.

FIG. 16A is an enlarged view showing a section A of the first sheet body 11 of the FIG. 14B; and FIG. 16B is an enlarged view showing a section C of the first sheet body 11 of the FIG. 14B. Further. FIG. 17A is an enlarged view showing a section B of the second sheet body 12 of FIG. 15A; and FIG. 17B is an enlarged view showing a section D of the second sheet body 12 of FIG. 15A. As shown in these figures, the wicks 22 are composed of the concave grooves 26 obtained through etching; and the unetched walls 27. That is, in the regions of the wicks 22, the plurality of the grooves 26 serving as passages of an operating fluid are formed into desired shapes by the walls 27.

The grooves 26 are located along the bilateral regions and end regions of the vapor passage 20; and are composed of the first grooves 26A, the second grooves 26B and the third grooves 26C as is the case with the first embodiment. The depth of the grooves 26 is 0.1 mm to 0.13 mm. As for a width d1 of the grooves 26, each of the first grooves 26A, the second grooves 26B and the third grooves 26C has a width of 0.12 mm. The number of the first grooves 26A provided is larger than that of the second grooves 26B, and the first grooves 26A finer than the second grooves 26B are located on the bilateral regions of and directly communicated with the vapor passage 20.

A width d4 of the side wall 23 is formed to 1 mm on the entire circumference of each of the sheet bodies 11 and 12. In this way, the sheet bodies 11 and 12 can be favorably diffusion-joined to each other at where the side walls 23 are formed, thus obtaining the sheet-type heat pipe 3 with a high reliability in sealing the container 15.

Figure 18:
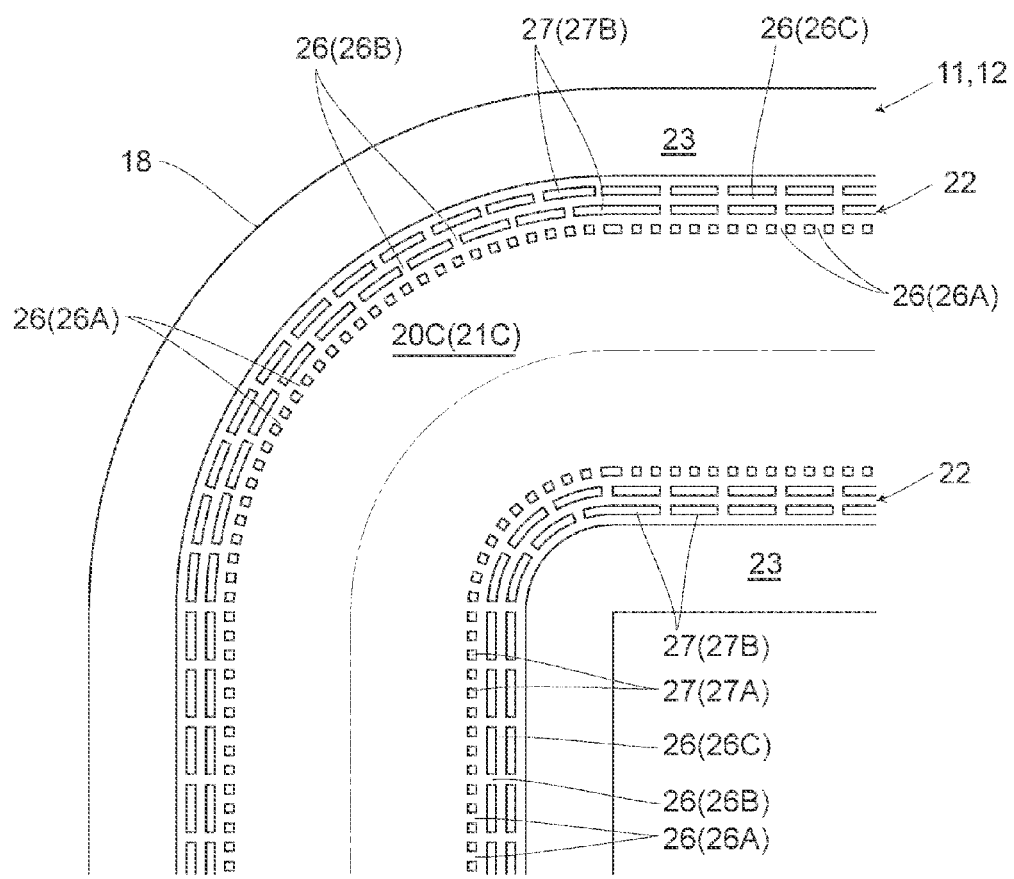
FIG. 18 is a detailed enlarged view of a section E shown in FIG. 14B and FIG. 15A.

FIG. 18 is an enlarged view showing a section E of each of the sheet bodies 11 and 12 of FIG. 14B and FIG. 15A. As shown in FIG. 18, the aforementioned structure of the wicks 22 is likewise established between the vapor passage 20 and the side wall 23 even in the bended portions 18 of the sheet-type heat pipe 3. Here, the width d1 of the grooves 26 is formed to 0.12 mm.

Fourth Embodiment

FIG. 19A to FIG. 26 show a sheet-type heat pipe 4 of a fourth embodiment of the present invention. As shown in each of these figures, the sheet-type heat pipe 4 of this embodiment is composed of the container 15 obtained by diffusion-joining together not only the first and second sheet bodies 11 and 12 but also a third sheet body 13 laminated between the sheet bodies 11 and 12. That is, the container 15 is made of these three copper foil sheets. No limitation is imposed on the numbers of the sheet bodies 11, 12 and 13 as long as two or more of them are employed. As for the first sheet body 11 and the second sheet body 12 that serve as the outermost layers and form one and the other side surfaces of the container, half-etching is performed exclusively on one side surface of each of the sheet bodies 11 and 12 whereas full-etching is performed on the two side surfaces of the third sheet body 13 serving as the middle layer.

Figures 19A, 19B:
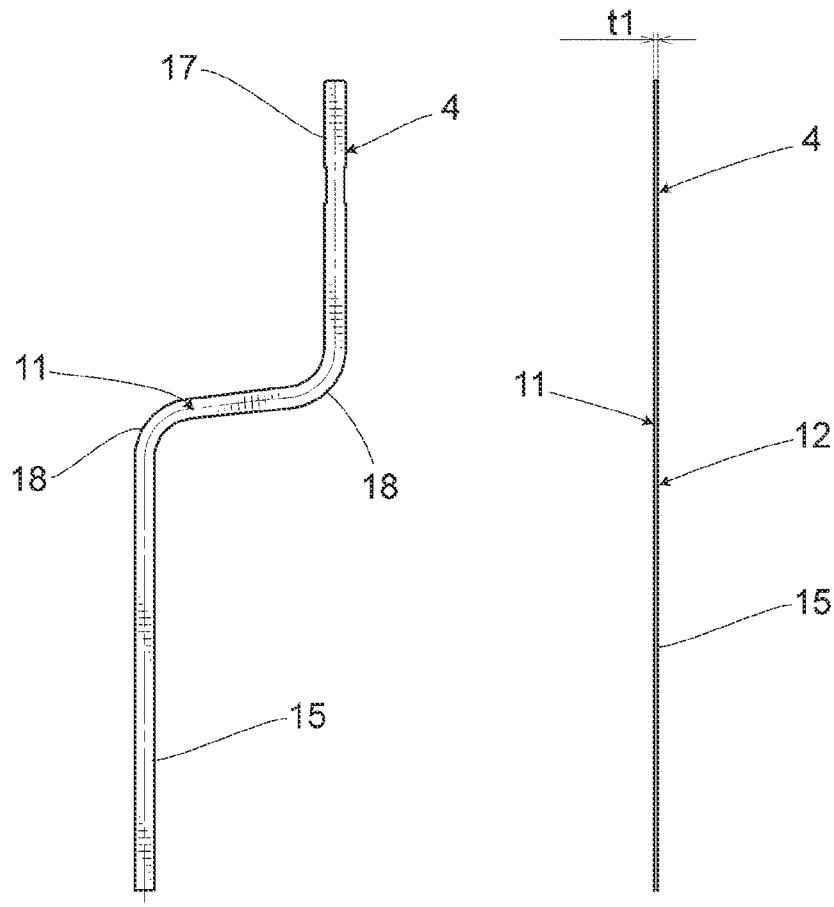
FIG. 19A is a planar view of a completed sheet-type heat pipe of a fourth embodiment of the invention.
FIG. 19B is a side view of the completed sheet-type heat pipe of the fourth embodiment of the invention.

As shown in FIG. 19A and FIG. 19B, the sheet-type heat pipe 4 of the present embodiment has an outer shape substantially identical to that of the sheet-type heat pipe 2 of the second embodiment. That is, the sheet-type heat pipe 4 is formed into the shape of a thin and elongated planar stick as compared to the sheet-type heat pipe 1 of the first embodiment. Further, in consideration of the chassis inner structure of the mobile terminal 51, two bended portions 18 are formed on the sheet-type heat pipe 4 if necessary. The tube-shaped sealing portion 17 is formed at one end of the container 15 so that an operating fluid such as pure water can be vacuum-encapsulated inside the container 15. A thickness t1 of the container 15 sealed by the sealing portion 17, i.e. a thickness of the sheet-type heat pipe 4 is 0.5 mm.

Figures 20A, 20B:
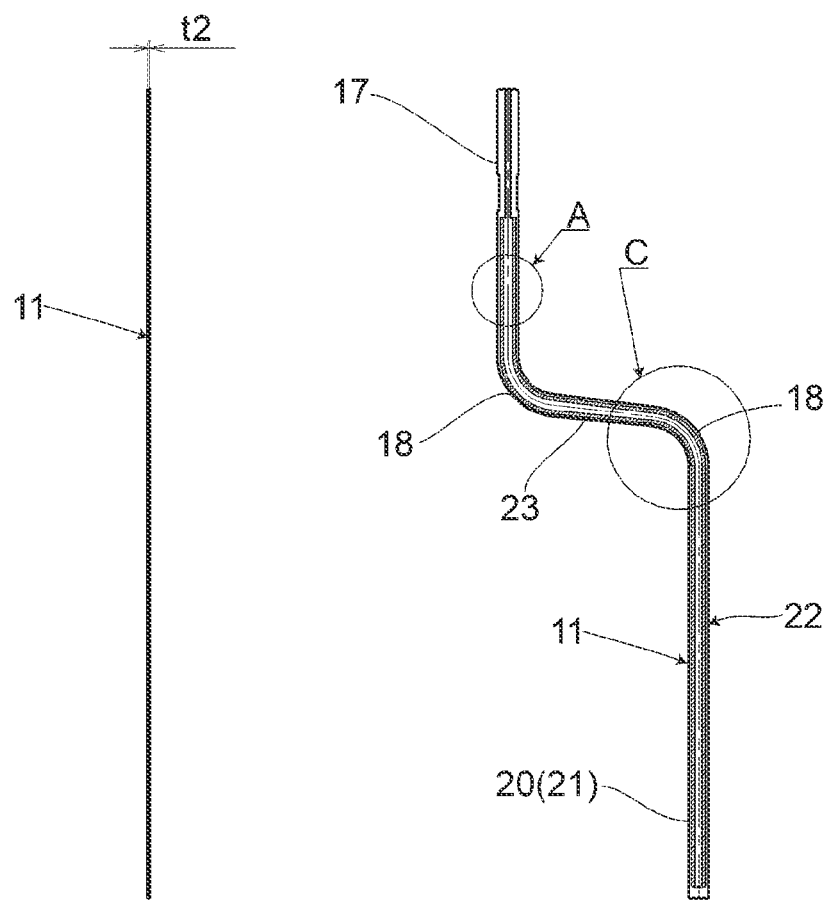
FIG. 20A is a side view of a first sheet body of the fourth embodiment of the invention.
FIG. 20B is a planar view of the first sheet body of the fourth embodiment of the invention.
Figures 21A, 21B:
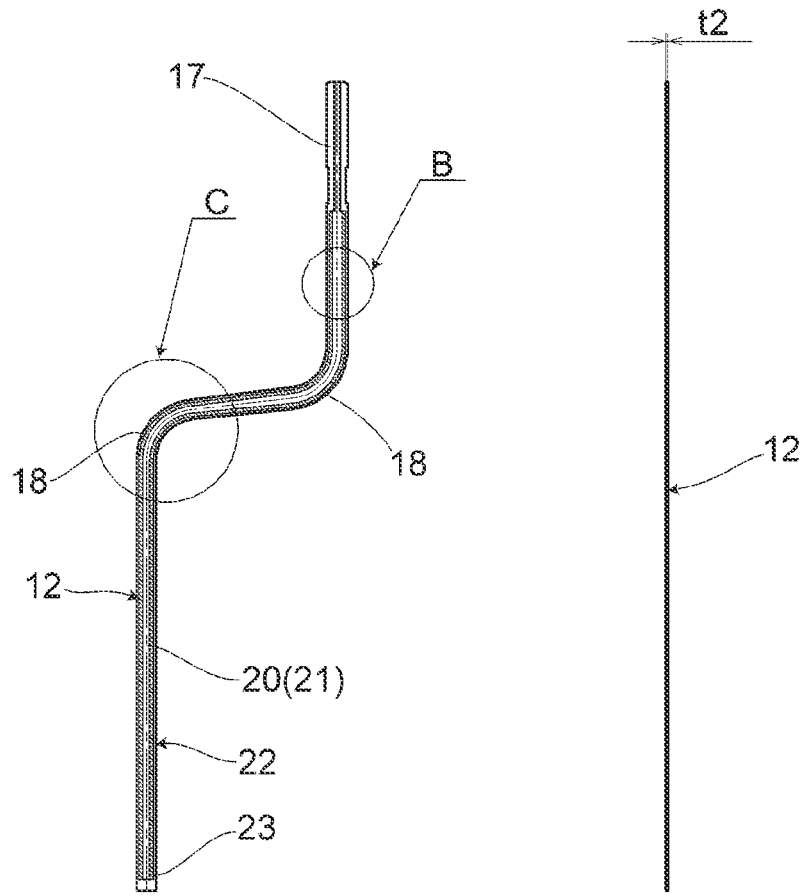
FIG. 21A is a planar view of a second sheet body of the fourth embodiment of the invention.
FIG. 21B is a side view of the second sheet body of the fourth embodiment of the invention.

FIG. 20A and FIG. 20B show the first sheet body 11; and FIG. 21A and FIG. 21B show the second sheet body 12, respectively. A thickness t2 of each of the sheet bodies 11 and 12 is 0.2 mm. Further, the vapor passage 20, the wicks 22 and the side wall 23 are formed exclusively on one side surface of each of the sheet bodies 11 and 12 through half-etching. In this embodiment, the wicks 22 are provided on both sides of the vapor passage 20 that is unidirectionally extended along the outer shape of the sheet-type heat pipe 4, and the side wall 23 is arranged outside the wicks 22.

Figures 22A, 22B:
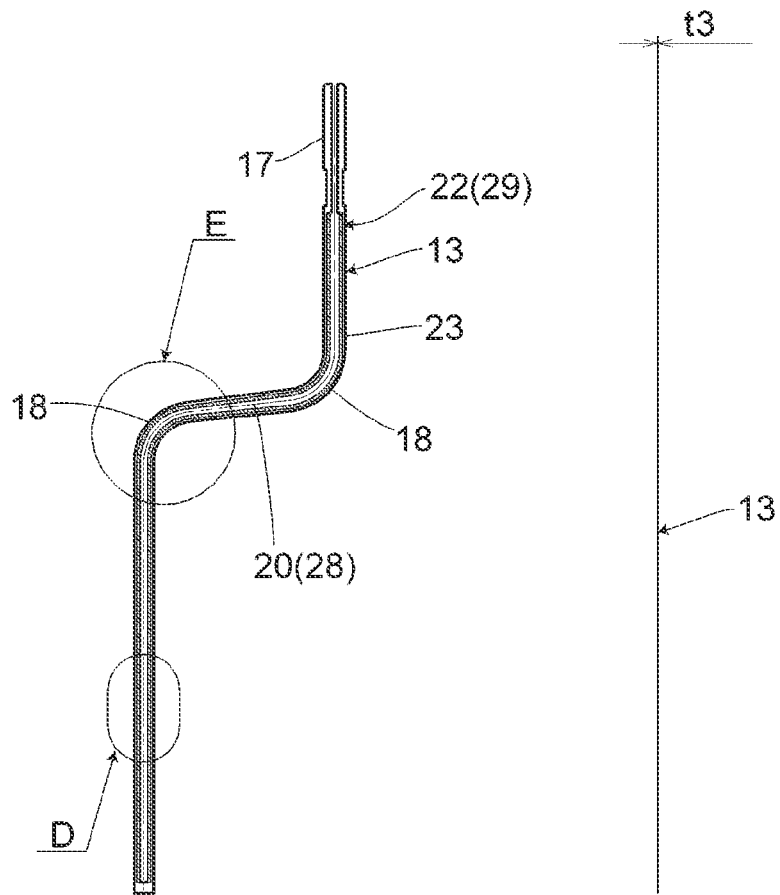
FIG. 22A is a planar view of a third sheet body of the fourth embodiment of the invention.
FIG. 22B is a side view of the third sheet body of the fourth embodiment of the invention.

FIG. 22A and FIG. 22B show the third sheet body 13. A thickness t3 of the third sheet body 13 is 0.1 mm. A penetrated section 28 and through-grooves 29 both passing through the third sheet body 13 are formed through full-etching. Particularly, the penetrated section 28 is continuously provided from one end of the third sheet body 13 to the other. That is, the penetrated section 28 forms a part of the vapor passage 20 as a result of further laminating the other sheet bodies 11 and 12. Further, the slit-shaped through-grooves 29 are formed on both sides of the penetrated section 28, from one end of the third sheet body 13 to the other. Specifically, the through-grooves 29 form a part of the wicks 22 as a result of further laminating the other sheet bodies 11 and 12. Moreover, formed outside the through-grooves 29 is the unetched side wall 23. In fact, the side walls 23 of the sheet bodies 11, 12 and 13 are formed in locations where these side walls 23 are allowed to be laid on top of one another as a result of laminating the sheet bodies 11 and 12 with the third sheet body 13 sandwiched therebetween and with the one side surfaces of such sheet bodies 11 and 12 facing each other. These side walls 23 eventually form the outer circumferential portion of the container 15 through diffusion joining. Here, in FIG. 20B. FIG. 21A and FIG. 22A, the wicks 22 are shown as the shaded areas.

When forming the vapor passage 20 and the wicks 22 on the sheet bodies 11, 12 and 13 through photo-etching, half-etching is performed on the surface of each of the sheet bodies 11 and 12 having the thickness t2 of 0.05 mm to 0.3 mm whereas full-etching is performed on the surface of the third sheet body 13 having the thickness t3 of 0.05 mm to 0.3 mm. In such case, the thickness t1 of the completed sheet-type heat pipe 4 is set to be not larger than 0.5 mm. Thus, there can be formed on the inner surface of the container 15 the fine vapor passage 20 and wicks 22 having a sufficient heat transport capability, and the sheet-type heat pipe 4 can be effortlessly installed in a thin chassis such as that of the mobile terminal 51.

The vapor passage 20 of the fourth embodiment is composed of the concave passage section 21 and the penetrated section 28. Particularly, this passage section 21 is established inside the sealed container 15 and is formed on each of the sheet bodies 11 and 12 along the longitudinal direction of the sheet-type heat pipe 4. Further, the penetrated section 28 is formed on the third sheet body 13. That is, when laminating the sheet bodies 11, 12 and 13 on top of one another, the passage sections 21 of the sheet bodies 11 and 12 are allowed to face each other on both sides of the penetrated section 28, thus forming a single and hollow tube-shaped vapor passage 20. Moreover, inside the container 15, the wicks 22 are formed in locations other than where the vapor passage 20 and the side wall 23 are provided.

FIG. 23A is an enlarged view showing a section A of the first sheet body 11 of FIG. 20B; and FIG. 23B is an enlarged view showing a section B of the second sheet body 12 of FIG. 21A. Here, the wicks 22 are also composed of the concave grooves 26 obtained through etching; and the unetched walls 27. Further, the plurality of the grooves 26 as passages of an operating fluid are established in the regions of the wicks 22, and are formed into desired shapes by the walls 27.

The grooves 26 are located along the bilateral regions and end regions of the vapor passage 20. As is the case with the first embodiment, the grooves 26 are composed of the first grooves 26A, the second grooves 26B and the third grooves 26C. The depth of the grooves 26 is 0.1 mm to 0.13 mm. As for a width d1 of the grooves 26, each of the first grooves 26A, the second grooves 26B and the third grooves 26C has a width of 0.12 mm. The number of the first grooves 26A provided is larger than the number of the second grooves 26B provided; and the first grooves 26A finer than the second grooves 26B are arranged on the bilateral regions of and directly communicated with the vapor passage 20.

A width d4 of the side wall 23 is formed to 0.4 mm on the entire circumference of each of the sheet bodies 11, 12 and 13. Therefore, the sheet bodies 11, 12 and 13 can be favorably diffusion-joined to one another at where the side walls 23 are formed, thus obtaining a sheet-type heat pipe 4 with a high reliability in sealing the container 15.

FIG. 24 is an enlarged view showing a section C of each of the sheet bodies 11 and 12 of FIG. 20B and FIG. 21A. As shown in FIG. 24, the aforementioned structure of the wicks 22 is likewise established between the vapor passage 20 and the side wall 23 in the bended portions 18 of the sheet-type heat pipe 4. Here, the width d1 of the grooves 26 is also formed to 0.12 mm.

Figure 25:
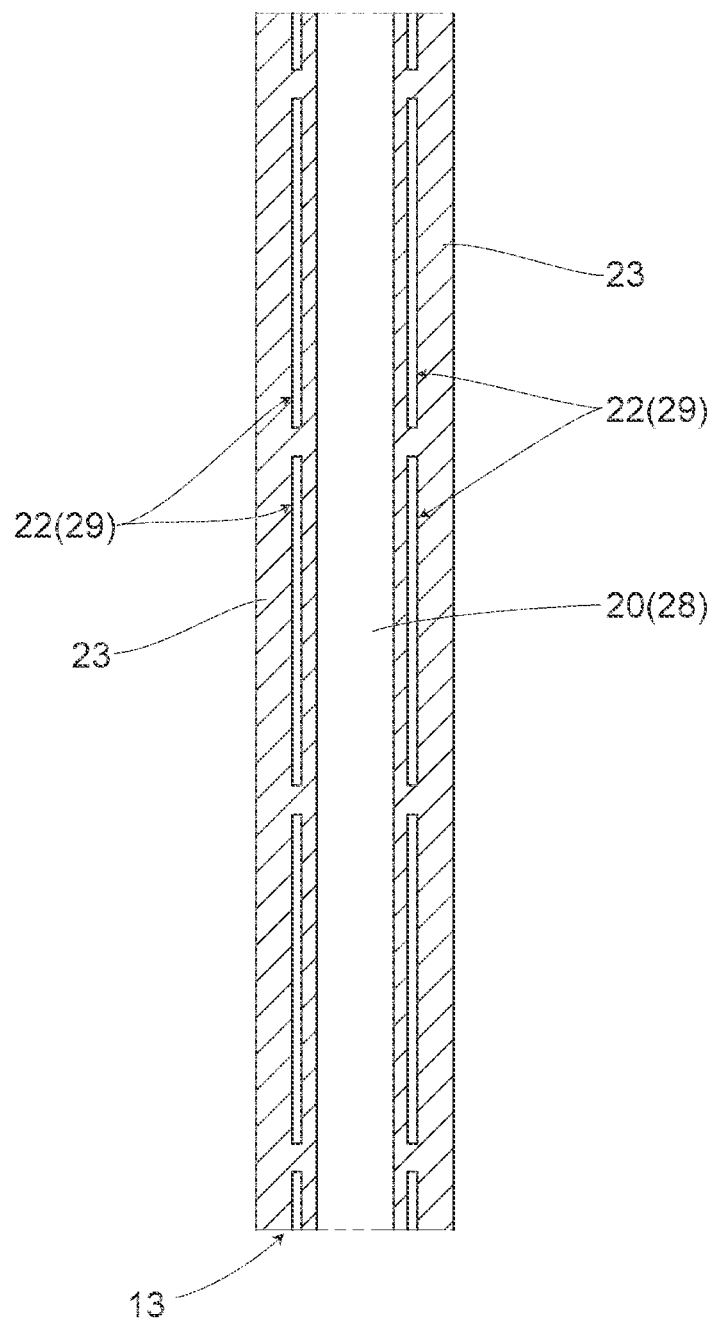
FIG. 25 is a detailed enlarged view of a section D shown in FIG. 22A.
Figure 26:
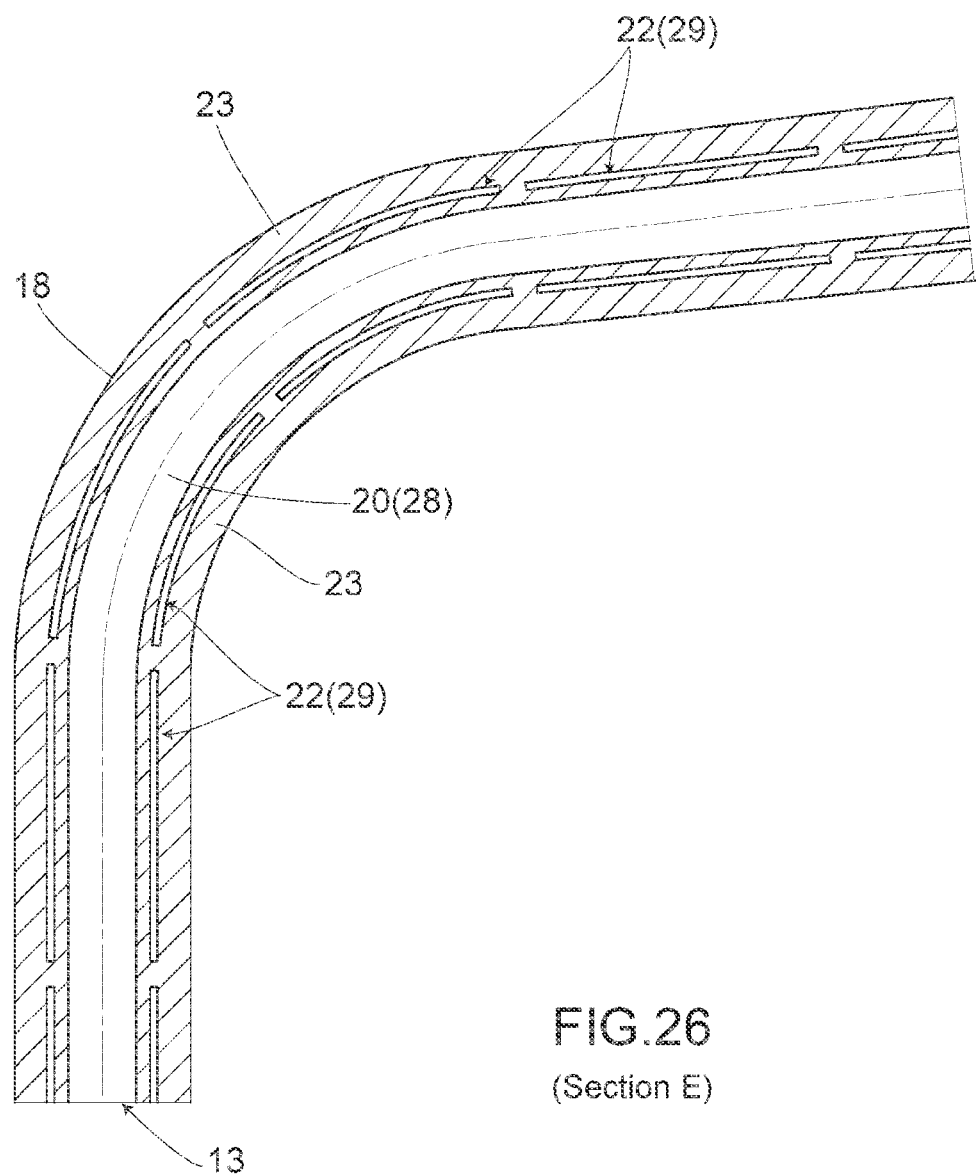
FIG. 26 is a detailed enlarged view of a section E shown in FIG. 22A.

FIG. 25 is an enlarged view showing a section D of the third sheet body 13 of FIG. 22A. Further, FIG. 26 is an enlarged view showing a section E of the third sheet body 13 of FIG. 22A. The third sheet body 13 includes the penetrated section 28 as a part of the vapor passage 20; and the through-grooves 29 aligned on both sides of the penetrated section 28, the penetrated section 28 and the through-grooves 29 being respectively formed in a penetrated manner.

Next, working principles of the sheet-type heat pipes of the aforementioned embodiments are described with reference to FIG. 27. Although FIG. 27 only shows the sheet-type heat pipe 2 of the second embodiment, the basic working principle thereof is identical to those of the sheet-type heat pipes 1, 3 and 4 of the other embodiments.

As for the sheet-type heat pipe 2, a portion thermally connected to a heat source serves as a heat receiving portion 31, whereas a portion for discharging the heat received by the heat receiving portion 31 toward the outside serves a heat dissipation portion 32. As for the sheet-type heat pipe 3 of the third embodiment, the heat receiving portion 19 is established at the other end thereof such that the heat dissipation portion 32 is thus provided at the one end of the sheet-type heat pipe 3. However, as for each of the sheet-type heat pipes 1, 2 and 4, the locations of the heat receiving portion 31 and the heat dissipation portion 32 vary in accordance with the location where the heat pipe is thermally connected to the heat source. Here, for the purpose of illustration, the heat receiving portion 31 is considered as being located at the other end of the sheet-type heat pipe 2, and the heat dissipation portion 32 is considered as being located at the one end of the sheet-type heat pipe 2.

The working principle of the sheet-type heat pipe 2 is as follows. At the heat receiving portion 31, an operating fluid evaporates inside the container 15 as a result of receiving the heat from the heat source, thereby increasing a pressure with an evaporative latent heat being stored in the vapor. This vapor then flows from the heat receiving portion 31 to the heat dissipation portion 32 through the vapor passage 20 inside the container 15, thus making it possible to transport the heat from the heat receiving portion 31 to the heat dissipation portion 32 distant from the heat receiving portion 31. At the heat dissipation portion 32, the vapor is then condensed inside the container 15 such that a condensation latent heat can be discharged toward the outside of the sheet-type heat pipe 2. Further, the operating fluid accumulated in the heat dissipation portion 32 will be brought back to the heat receiving portion 31 through the wicks 22.

Figure 27:
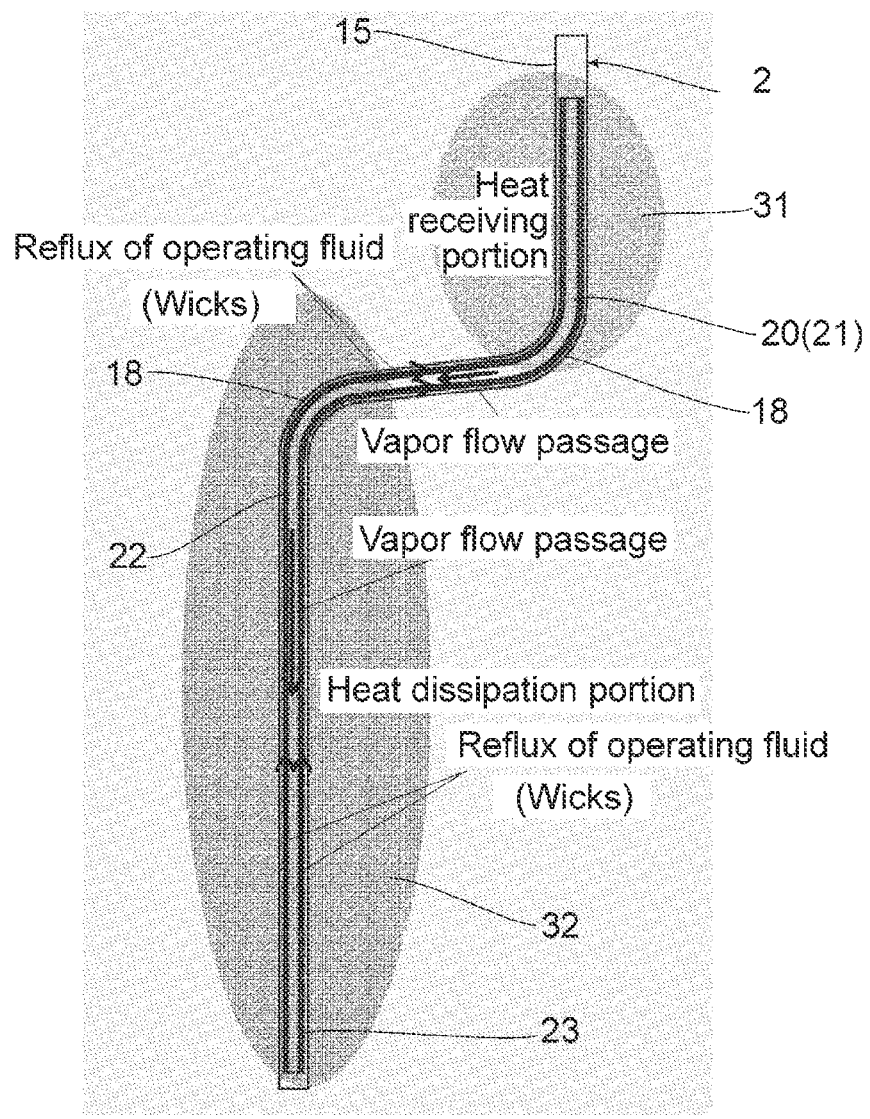
FIG. 27 is an explanatory diagram showing a working principle of each of the sheet-type heat pipes of the embodiments of the invention.

As shown in FIG. 27, denoted by arrows are a vapor flow passage established from the heat receiving portion 31 to the heat dissipation portion 32 through the vapor passage 20 as a space; and a reflux flow of the operating fluid that is established from the heat dissipation portion 32 to the heat receiving portion 31 through the wicks 22. The sheet-type heat pipe 2 of this embodiment is referred to as the "wick type (capillary type)" in terms of the operation method thereof. That is, the sheet-type heat pipe 2 has an inner structure capable of bringing the operating fluid accumulated in the heat dissipation portion 32 back to the heat receiving portion 31 through the capillary force of the wicks 22.

Figure 28:
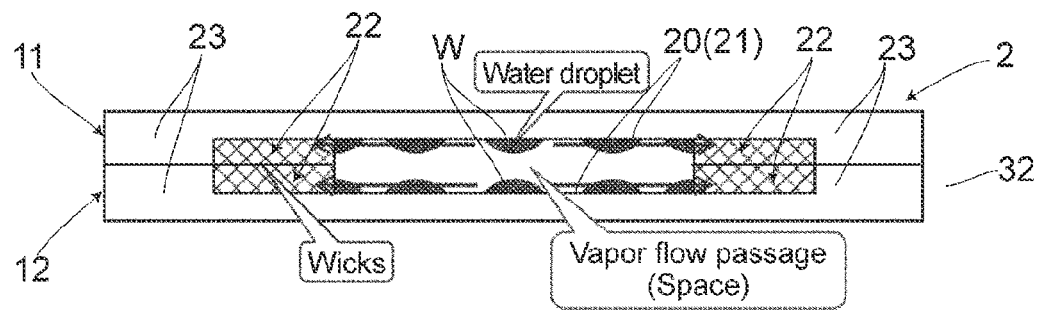
FIG. 28 is a cross-sectional view showing a state of a heat dissipation portion at the time of heat transportation, in the embodiments of the invention.

FIG. 28 is a diagram schematically showing a state of the heat dissipation portion 32 under the condition when heat is being transported. When the sheet-type heat pipe 2 i.e. the container 15 is formed to a thickness of not larger than 0.5 mm, especially to an extremely small thickness of not larger than 0.4 mm, established is a narrow vapor passage 20 such that the vapor flow generated at the heat receiving portion 31 will be condensed due to a flow resistance (pressure loss) and temperature decrease when passing through the vapor passage 20; and that the water droplets will then block the vapor passage 20 to significantly degrade the performance of the sheet-type heat pipe 2. That is, in the case of a thin sheet-type heat pipe 2, it is important to employ the structure of the wicks 22 capable of swiftly absorbing the water droplets inside the vapor passage 20; and it is required that the structure of the wicks 22 be designed well enough to be able to prevent the vapor passage 20 from being blocked.

As for each of the aforementioned embodiments, the structure of the wicks 22 is distinctively established as follows. That is, the grooves 26 formed as the wicks 22 on the sheet bodies 11, 12 are composed of the first grooves 26A that are adjacently arranged on both sides of the vapor passage 20; and the second grooves 26B that are formed more distant from the vapor passage 20 than the first grooves 26A. Further, the interval at which the first grooves 26A are provided is narrower than that of the second grooves 26B, and the number of the first grooves 26A provided is larger than that of the second grooves 26B. In this way, the wicks 22 are provided on both sides of the vapor passage 20, and the wicks 20 adjacent to the vapor passage 20 are formed finer, thus allowing the water droplets in the vapor passage 20 to be swiftly absorbed by the wicks 22. In FIG. 28, arrows are used to denote the flows of the water droplets W from the vapor passage 20 toward the wicks 22 that are arranged on both sides of the vapor passage 20, in a region where the heat dissipation portion 32 is provided.

Figure 29:
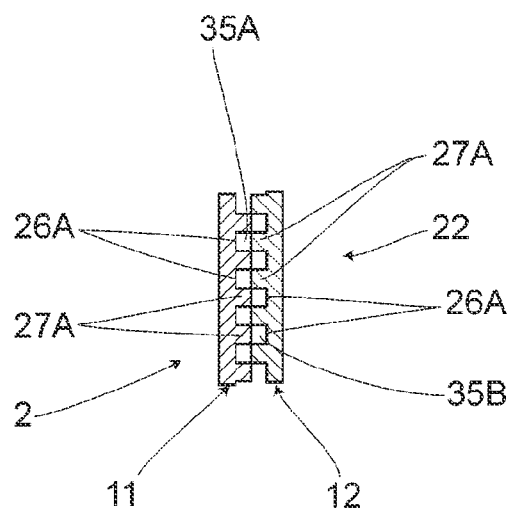
FIG. 29 is a cross-sectional view of the sheet-type heat pipe of the invention that is taken along a direction A shown in FIG. 11A.

Next, the structure of the wicks 22 is described in greater detail. FIG. 29 is a cross-sectional view of the sheet-type heat pipe 2 with the sheet bodies 11 and 12 being laid on top of each other. This cross-sectional view is taken on a direction A that is orthogonal to the direction of the vapor passage 20 shown in FIG. 11A. Further, the FIG. 30 likewise is a cross-sectional view of the sheet-type heat pipe 2 with the sheet bodies 11 and 12 being laid on top of each other. However, this cross-sectional view is taken on a direction B along the direction of the vapor passage 20 shown in FIG. 11A.

As shown in FIG. 29, with the sheet bodies 11 and 12 being laid on top of each other, the first grooves 26A of the first sheet body 11 and the first grooves 26A of the second grooves 26B are arranged in a staggered manner against one another in the direction X along the direction of vapor passage 20. Specifically, established in the staggered manner on both sides of the sheet bodies 11 and 12 are fluid passages 35A formed as a result of allowing the first walls 27A of the second sheet body 12 to block the opening sections of the first grooves 26A of the first sheet body 11; and fluid passages 35B formed as a result of allowing the first walls 27A of the first sheet body 11 to block the opening sections of the first grooves 26A of the second sheet body 12. That is, as for the wicks 22 adjacent to the vapor passage 20, formed on each of the sheet bodies 11 and 12 having a thickness t2 of 0.2 mm are the first grooves 26A that are finely miniaturized to the utmost limit through etching. Moreover, the first grooves 26A of the front and rear sheet bodies 11 and 12 are then arranged in the staggered manner against one another such that the fluid passages 35A and 35B can thus be respectively formed on the sheet bodies 11 and 12 as the sheet bodies 11 and 12 facing each other mutually block the opening sections of the first grooves 26A. In this way, it is possible to finely miniaturize the structure of the wicks 22 to the utmost limit even when the sheet-type heat pipe 2 is formed extremely thin.

Figure 30:
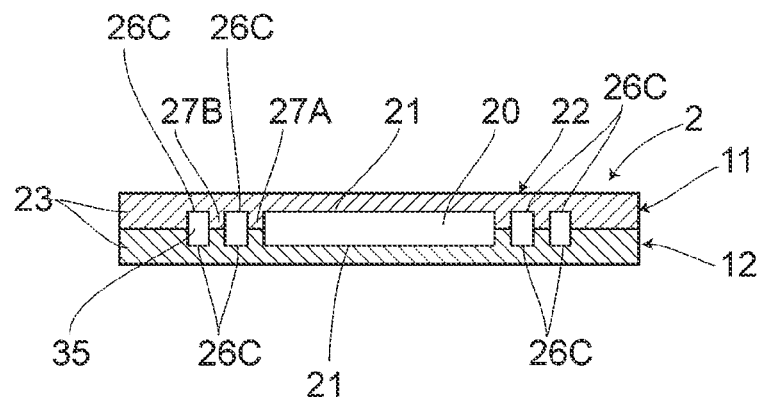
FIG. 30 is a cross-sectional view of the sheet-type heat pipe of the invention that is taken along a direction B shown in FIG. 11A.

Meanwhile, as shown in FIG. 30, with the sheet bodies 11 and 12 being laid on top of each other, the third grooves 26C of the first sheet body 11 and the third grooves 26C of the second sheet body 12 face one another in the direction A orthogonal to the direction of the vapor passage 20. Specifically, fluid passages 35 straddling the sheet bodies 11 and 12 are established as the third grooves 26C of the second sheet body 12 block the opening sections of the third grooves 26C of the first sheet body 11. The cross-sectional area of each fluid passage 35 is formed larger than the cross-sectional area of each of the fluid passages 35A and 35B that are provided in the staggered manner on both sides of the sheet bodies 11 and 12. Therefore, the water droplets taken in by the wicks 22 through the fluid passages 35A and 35B can be smoothly refluxed to the heat receiving portion 31 through the fluid passage 35.

In addition, as mentioned above, the locations of the heat receiving portion 31 and the heat dissipation portion 32 vary in accordance with the location where each of the sheet-type heat pipes 1, 2 and 4 is thermally connected to the heat source. However, as is the case with the sheet-type heat pipe 1 of the first embodiment, since the plurality of the first vapor paths 20A formed inside the container 15 are all communicated with the single second vapor path 20B, a thermal uniformity can be achieved in the entire area of the sheet-type heat pipe 1 regardless of where the heat receiving portion 31 and the heat dissipation portion 32 are located on the sheet-type heat pipe 1.

Described hereunder are the structures, functions and effects of the sheet-type heat pipes 1, 2, 3 and 4 of the aforementioned embodiments when installed in the thin mobile terminal 51.

Figure 31:
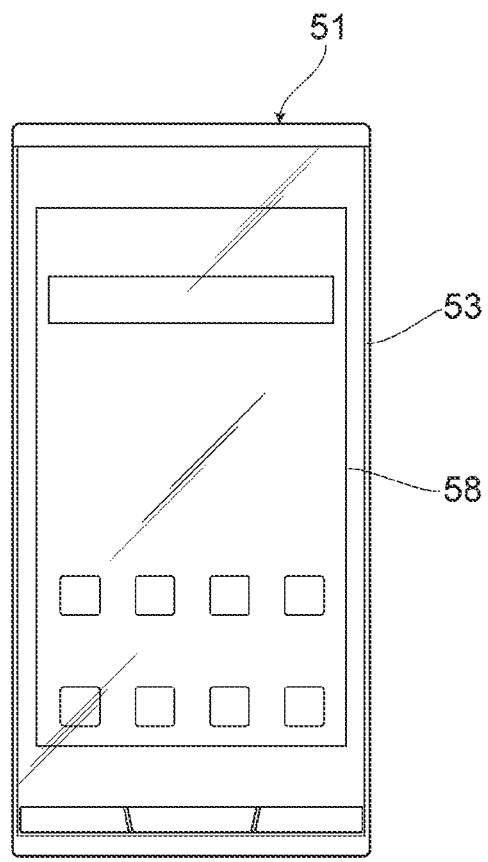
FIG. 31 is an external view of a smartphone as a mobile terminal in which the sheet-type heat pipe of any one of the first through the fourth embodiments is to be installed.

FIG. 31 shows the appearance of the mobile terminal 51 in which each of the sheet-type heat pipes 1, 2, 3 and 4 is to be installed. Further, FIG. 32A and FIG. 32B show the inner structure of the mobile terminal 51 in which the sheet-type heat pipe 1 of the first embodiment has been installed. The mobile terminal 51 shown in FIG. 31 and FIG. 32A and FIG. 32B is a smartphone that is formed smaller than a tablet terminal and has an external size small enough to be held by hand. Particularly, the mobile terminal 51 includes a longitudinal rear cover 52 that is substantially formed into a rectangular shape. Here, a flat outer frame (chassis) of the mobile terminal 51 is formed by attaching the rear cover 52 to the rear surface region of a tabular touch panel 53. Disposed inside the chassis of the mobile terminal 51 are a CPU (central processing unit) 54 serving as a control unit of the mobile terminal 51; various electronic components other than the CPU 54; a printed circuit board 56 serving as a substrate; and a rechargeable battery pack 57 that is formed into a flat and substantially rectangular shape and is used as a charging component to supply necessary electric power to the CPU 54 and other electronic components. Specifically, the CPU 54 and the various electronic components other than the CPU 54 are mounted on the printed circuit board 56 when disposed inside the mobile terminal 51; and the battery pack 57 is in fact detachably received in the mobile terminal 51. Further, provided on the front surface region of the touch panel 53 is an operation display 58 formed by integrally combing a input and output devices; whereas the rear surface of the touch panel 53 that faces the front surface region opening section of the rear cover 52 is composed as a flat and smooth metal plate 59 such as an aluminum plate. The operation display 58 is exposed on the front surface of the mobile terminal 51 such that the user can touch the operation display 58 with his/her finger(s).

As shown in FIG. 32A and FIG. 32B, the sheet-type heat pipe 1 of the first embodiment has the outer shape matched to the chassis inner shape of the mobile terminal 51. That is, the single sheet-type heat pipe 1 can be installed inside the chassis of the mobile terminal 51 as it is. Here, it is preferred that the sheet-type heat pipe 1 be installed in a region occupying not less than 50% of the rear surface of the touch panel 53. One part of the side surface of the sheet-type heat pipe 1 serves as a heat receiving portion, and is in contact with and thermally connected to the CPU 54 as a heat source. Meanwhile, the other part of the side surface of the sheet-type heat pipe 1 serves as a heat dissipation portion, and is in contact with and thermally connected to the battery pack 57. Moreover, another side surface of the sheet-type heat pipe 1 is entirely in contact with and thermally connected to the metal plate 59 as the rear surface of the touch panel 53; especially, a portion of such another side surface that is distant from the CPU 54 is formed as a heat dissipation portion.

Figure 1B:
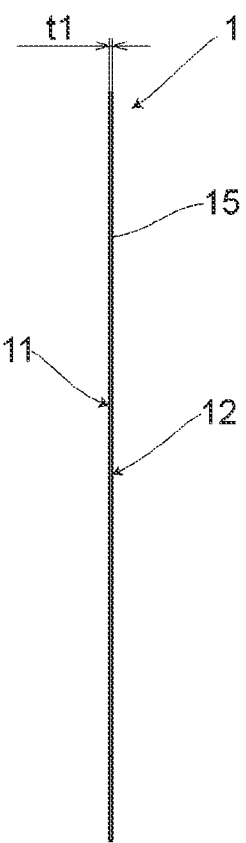
FIG. 1B is a side view of the completed sheet-type heat pipe of the first embodiment of the invention.

FIG. 33 shows the sheet-type heat pipe 1 that is about to be installed in the mobile terminal 51. Here, the completed sheet-type heat pipe 1 shown in FIG. 1A and FIG. 1B is processed as follows. That is, the sealing portion 17 protruding downward from the container 15 is cut off while maintaining the sealed state of the container 15. Particularly, FIG. 33 shows the sheet-type heat pipe 1 of a condition where the front end of the sealing portion 17 has been cut off such that the sheet-type heat pipe 1 can now be disposed inside the chassis of the mobile terminal 51 without being hindered by the sealing portion 17.

As for the mobile terminal 51 shown in FIG. 32A and FIG. 32B, when the CPU 54 or the like produces heat such that the temperature inside the chassis increases, the heat from the CPU 54 will be transported to the heat receiving portion of the one side surface of the sheet-type heat pipe 1.

Accordingly, the operating fluid will evaporate at the heat receiving portion, and the vapor thus generated will then flow from the heat receiving portion toward the heat dissipation portion having a low temperature, through the vapor passage 20. In other words, heat transport takes place inside the sheet-type heat pipe 1. The heat transported to the heat dissipation portion will be thermally diffused in a large and planar region of the sheet-type heat pipe 1, and will then be released to both the battery pack 57 and the metal plate 59 as the rear surface of the touch panel 53 from the front and rear sides, i.e. the one and other side surfaces of the sheet-type heat pipe 1. In this way, since the mobile terminal 51 allows the heat produced by the CPU 54 or the like to be thermally diffused in a large area, a heat spot(s) occurring on the outer frame surface of the touch panel 53 or the like can be alleviated, thereby making it possible to restrict the temperature of the CPU 54 from increasing.

Moreover, although the vapor will be condensed such that the operating fluid will then be collected at the heat dissipation portion of the sheet-type heat pipe 1, the operating fluid will actually be brought back from the heat dissipation portion to the heat receiving portion through a strong capillary force of the grooves 22 that are formed on both sides of the vapor passage 20 inside the sheet-type heat pipe 1. Specifically, the operating fluid is brought back to the heat receiving portion by travelling from the fluid passages 35A and 35B that are orthogonal to the vapor passage 20 through the fluid passage 35 that is formed along the vapor passage 20. Therefore, the operating fluid shall never be absent at the heat receiving portion; particularly, the operating fluid that has evaporated at the heat receiving portion will be guided to the heat dissipation portion along the grooves 22 through the capillary force, thereby allowing evaporation to continuously take place, thus allowing the sheet-type heat pipe 1 to exhibit its primary capabilities.

Further, the thickness t1 of the sheet-type heat pipe 1 itself is not larger than 0.5 mm. Especially, in the case of the mobile terminal 51 such as a smartphone, the sheet-type heat pipe 1 can be used in the chassis thereof that is limited to a certain thickness for ease of use. Particularly, the sheet-type heat pipe 1 allows the heat of the CPU 54 or the like to be swiftly and thermally diffused in a large area while exhibiting and maintaining a significantly favorable thermal conductivity as compared to a graphite sheet.

Figure 36:
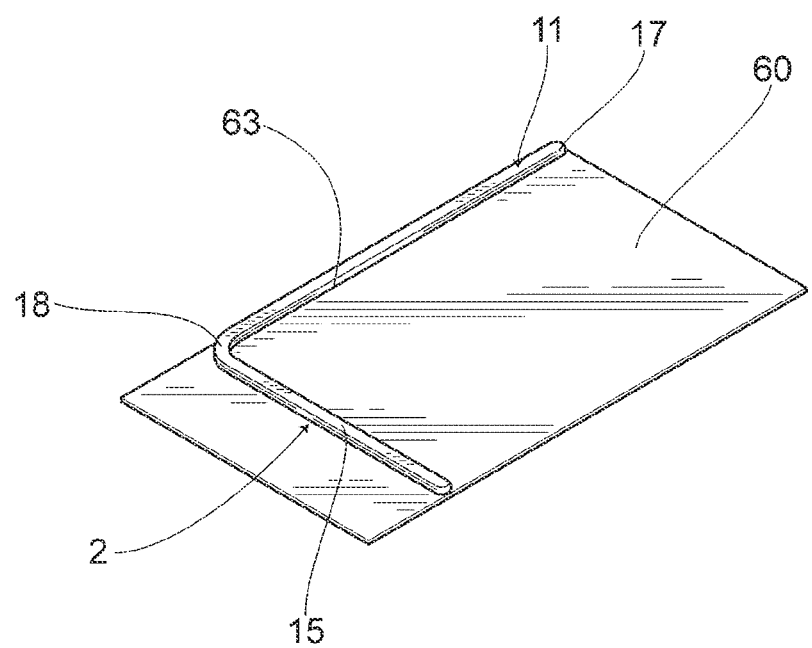
FIG. 36 is an external view of a cooling unit obtained by thermally connecting the sheet-type heat pipe of the second embodiment to a heat dissipation plate.

FIG. 34A and FIG. 34B show the inner structure of the mobile terminal 51 in which the sheet-type heat pipe 2 of the second embodiment has been installed. Here, as shown in FIG. 35, the sheet-type heat pipe 2 is substantially formed into the shape of "L" with only one bended portion 18 being established midway through the container 15. As shown in FIG. 36, with regard to the thin sheet-type heat pipe 2 such as the one of the second embodiment, a cooling unit obtained by thermally connecting the sheet-type heat pipe 2 to a heat dissipation plate 60 is to be installed inside the chassis of the mobile terminal 51. The heat dissipation plate 60 is made of a metal such as an aluminum alloy exhibiting a thermal conductivity of not lower than 15 W/m·k and a thickness of not larger than 0.3 mm. A plated layer (not shown) such as that of nickel or tin is to be formed on the heat dissipation plate 60, followed by joining the sheet-type heat pipe 2 to this heat dissipation plate 60 through a low-temperature solder 63 that serves as a joining material and has a melting point of not higher than 160° C. Soldering using the low-temperature solder 63 not only allows the sheet-type heat pipe 2 and the heat dissipation plate 60 to be thermally joined to each other in a favorable manner, but also eliminates the concern that the sheet-type heat pipe 2 may be deformed and swell due to the heat generated at the time of performing soldering. In addition, similar functions and effects can be achieved even when thermally joining each of the other thin sheet-type heat pipes 3 and 4 to the heat dissipation plate 60, instead of the sheet-type heat pipe 2.

Again, with reference to FIG. 34A and FIG. 34B, the structure of the mobile terminal 51 is described as above. Here, installed is the rectangular plate-shaped heat dissipation plate 60 thermally joined together with the L-shaped sheet-type heat pipe 2. Particularly, the sheet-type heat pipe 2 is provided on the rear surface region of the heat dissipation plate 60 and along the side surface of the battery pack 57 that is formed into the shape of a rectangular box. Further, the CPU 54 is disposed on the front surface side of the printed circuit board 56 in a manner such that a part of the sheet-type heat pipe 2 is arranged in the vicinity of the CPU 54. The heat dissipation plate 60 has an outer shape matched to the chassis inner shape of the mobile terminal 51.

As for the mobile terminal 51 shown in FIG. 34A and FIG. 34B, when the CPU 54 or the like produces heat such that the temperature inside the chassis increases, the heat from the CPU 54 will be transported to the heat receiving portion of the sheet-type heat pipe 2 through the heat dissipation plate 60. Further, the operating fluid will evaporate at the heat receiving portion such that the vapor thus generated will then flow from the heat receiving portion toward the heat dissipation portion having a low temperature, through the vapor passage 20. In other words, heat transport takes place inside the sheet-type heat pipe 2. The heat transported to the heat dissipation portion will be thermally diffused in a large and planar region of the heat dissipation plate 60, and will then be released from the front and rear surfaces of the heat dissipation plate 60 to both the metal plate 59 as the rear surface of the touch panel 53 and the battery pack 57. In this way, since the mobile terminal 51 allows the heat produced by the CPU 54 or the like to be thermally diffused in a large area, a heat spot(s) occurring on the outer frame surface of the touch panel 53 or the like can be alleviated, thereby making it possible to restrict the temperature of the CPU 54 from increasing.

Moreover, although the vapor will be condensed such that the operating fluid will then be collected at the heat dissipation portion of the sheet-type heat pipe 2, the operating fluid will actually be brought back from the heat dissipation portion to the heat receiving portion through a strong capillary force of the grooves 22 that are formed on both sides of the vapor passage 20 inside the sheet-type heat pipe 2. Specifically, the operating fluid is brought back to the heat receiving portion by travelling from the fluid passages 35A and 35B that are orthogonal to the vapor passage 20 through the fluid passage 35 that is formed along the vapor passage 20. Therefore, the operating fluid shall never be absent at the heat receiving portion; particularly, the operating fluid that has evaporated at the heat receiving portion will be guided to the heat dissipation portion along the grooves 22 through the capillary force, thereby allowing evaporation to continuously take place, thus allowing the sheet-type heat pipe 2 to exhibit its primary capabilities.

Further, the thickness t1 of the sheet-type heat pipe 2 itself is not larger than 0.5 mm. Furthermore, by employing the heat dissipation plate 60, there is no need to lay the sheet-type heat pipe 2 over the CPU 54 and the battery pack 57. Especially, in the case of the mobile terminal 51 such as a smartphone, the sheet-type heat pipe 2 can be used in the chassis thereof that is limited to a certain thickness for ease of use. Particularly, the sheet-type heat pipe 2 allows the heat of the CPU 54 or the like to be swiftly and thermally diffused in a large area while exhibiting and maintaining a significantly favorable thermal conductivity as compared to a graphite sheet.

FIG. 37 shows test results obtained by comparing with one another the ways the temperature of the mobile terminal 51 increases due to differences in a cooling structure. As shown in FIG. 37, a test was performed on the following cooling structures including a structure called "Full surface-type SHP (BC1)" obtained by installing the sheet-type heat pipe 1 of the first embodiment inside the chassis of the mobile terminal 51; a structure called "Local-type SHP (BC3)+copper plate" obtained by installing inside the chassis of the mobile terminal 51 the cooling unit prepared by thermally joining the sheet-type heat pipe 3 of the third embodiment to the heat dissipation plate 60; and a structure called "Graphite sheet" obtained by installing a graphite sheet 73 inside the chassis of the mobile terminal 51. Specifically, the test was to measure a front surface temperature of the touch panel 53 of the mobile terminal 51; a rear surface temperature of the rear cover 52 of the mobile terminal 51; and the temperature of a heat-source heater 71 serving as a heat source. More specifically, these temperatures are shown in FIG. 4 as "Outer frame temperature" and "Heat source temperature." Especially, as for the "Outer frame temperature," a "Touch panel" temperature and a "Chassis rear surface" temperature are shown as images of temperature distributions on the entire surfaces. Further, also shown in FIG. 37 are an "Installation method," a "Limit thickness," a "Merit(s)" and a "Thermal performance" of each cooling structure.

As shown in the "Installation method" of FIG. 37, the test was performed by attaching the heat-source heater 71 and a thermocouple 72 to the smartphone as the mobile terminal 51. As the test conditions, an ambient temperature was set to be 25° C.; the heat value of the heat-source heater 71 was set to be 5 W; and measured was a temperature obtained after 20 minutes had elapsed. Further, the thickness of the sheet-type heat pipe 1 used in the "Full surface-type SHP (BC1)" was 0.5 mm; the thicknesses of the sheet-type heat pipe 3 and the heat dissipation plate 60 that were used in the "Local-type SHP (BC3)+copper plate" were 0.5 mm and 0.2 mm, respectively; and the thickness of the graphite sheet 73 used in the "Graphite sheet" was 0.017 mm. The symbol "t" shown in "Limit thickness" corresponds to the aforementioned thickness t1. As for "Thermal performance," with the cooling structure of "Graphite" being a reference, numbers are used to show a degree to which the front surface temperature of the "Panel" i.e. the touch panel 53 had decreased and a degree to which the temperature of the "heat source" i.e. the heat-source heater 71 had decreased, when employing the cooling structure of "Full surface-type SHP (BC1)" Likewise, with the cooling structure of "Graphite" being a reference, numbers are also used to show a degree to which the front surface temperature of the "Panel" i.e. the touch panel 53 had decreased and a degree to which the temperature of the "heat source" i.e. the heat-source heater 71 had decreased, when employing the cooling structure of "Local-type SHP (BC3)+copper plate."

It is understood from the aforementioned test results that, as compared to the conventional cooling structure of "Graphite sheet," each of the cooling structures of "Full surface-type SHP (BC1)" and "Local-type SHP (BC3)+copper plate" of the present embodiment allows the heat generated by the heat-source heater 71 to be widely diffused on the entire heat dissipation plate 60; and especially allows the heat spot(s) to be significantly alleviated on the front surface of the touch panel 53 and the rear surface of the rear cover 52. Moreover, each of the maximum temperature of the front surface of the touch panel 53, the maximum temperature of the rear surface of the rear cover 52 and the temperature of the heat-source heater 71 was reduced through thermal diffusion by 30° C. or more.

Particularly, as compared to the cooling structure of "Graphite sheet." the cooling structure of "Full surface-type SHP (BC1)" of the present embodiment allowed not only the maximum temperature of the touch panel 53 front surface to decrease by 19 K, but also the maximum temperature of the rear surface of the rear cover 52 to decrease by 3.2 K. Further, the temperature of the heat-source heater 71 was reduced by 36.8 K, i.e. a distinctively superior thermal diffusion capability was exhibited even among the first embodiment to the fourth embodiment. Similarly, as compared to the cooling structure of "Graphite sheet," the cooling structure of "Local-type SHP (BC3)+copper plate" of the present embodiment allowed not only the maximum temperature of the touch panel front surface to decrease by 17.3 K, but also the maximum temperature of the rear surface of the rear cover 52 to decrease by 5.3 K. In addition, the temperature of the heat-source heater 71 was reduced by 35.4 K, which also exhibited a superior thermal diffusion capability.

Described hereunder are detailed structures and modified embodiments of the embodiments 1 to 4.

FIG. 38A is a cross-sectional view of the section A of the first sheet body 11 of FIG. 11A that is taken on a line D-D; and FIG. 38B is a cross-sectional view of the section B of the second sheet body 12 of FIG. 11B that is taken on a line E-E. As shown in FIG. 38A and FIG. 38B, when performing half-etching on each of the sheet bodies 11 and 12, a ditched depth L1 of a passage section 21 composting the vapor passage 20 is formed to not smaller than 50% of the thickness t2 of each of the sheet bodies 11 and 12. As a result of forming a ditched section of such thickness L1 as the passage section 21 of the vapor passage 20 through etching, a sufficient vapor passage can be secured inside the container 15 even in the case of the thin sheet-type heat pipe 2. Further, when performing etching, although a ditched depth L2 of the grooves 26 composing the wicks 22 is inevitably shallower than the ditched depth L1 of the passage section 21 at the time of manufacturing (L1>L2), the fact that the ditched depth L2 of the grooves 26 is shallow endows the wicks 22 with a strong capillary force such that the performance of the sheet-type heat pipe 2 can be improved without difficulties in manufacturing.

FIG. 39 shows a modified embodiment of the sheet-type heat pipe 2. As for the wicks 22 shown in this figure, while the grooves 26 and the walls 27 are formed on the first sheet body 11, no walls 27 but only the grooves 26 are formed on the second sheet body 12. Further, by diffusion-joining the side walls 23 to each other with the one side surfaces of the half-etched sheet bodies 11 and 12 facing each other, there can be obtained the sheet-type heat pipe 2 with the desired wicks 22 being formed on both sides of the vapor passage 20. In this way, there can be formed the wicks 22 of various structures by ingeniously shaping the grooves 26 and the walls 27.

Figure 40:
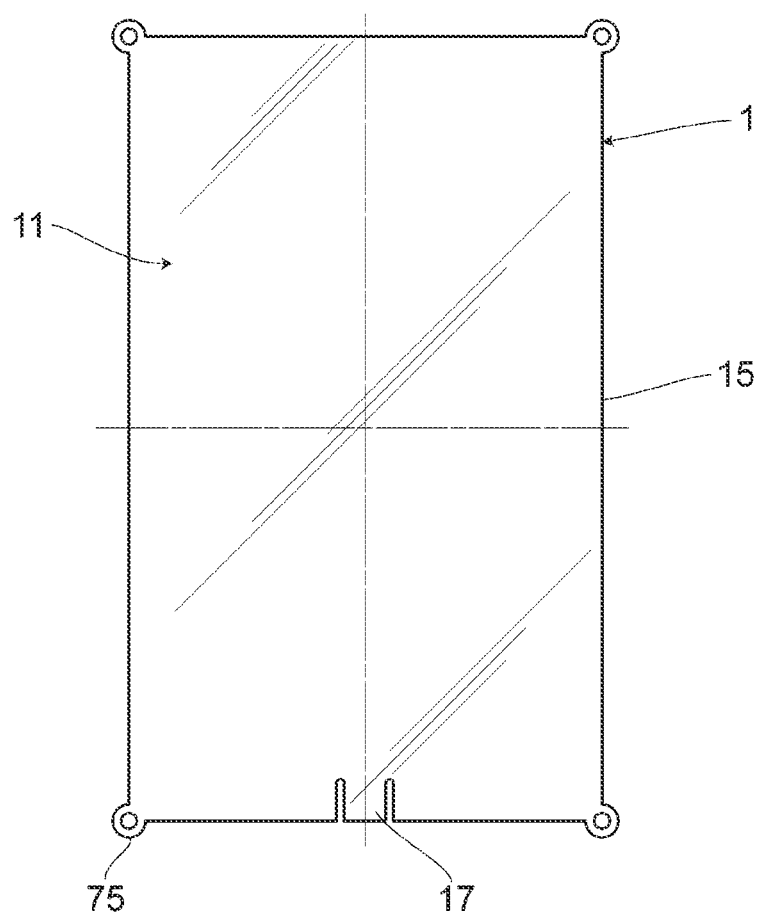
FIG. 40 is a planar view of a modified embodiment of the sheet-type heat pipe of the first embodiment.

FIG. 40 shows a modified embodiment of the sheet-type heat pipe 1 of the first embodiment. Provided on the four corners of the container 15 are attachment portions 75 instead of the chamfered portions 16. Each of the attachment portions 75 is formed as a through hole and allows the sheet-type heat pipe 1 to be attached to the chassis of the mobile terminal 51. For example, the attachment portions 75 can be matched to screw holes (not shown) formed on the rear surface portion of the touch panel 53, followed by inserting screws as fixing members through the attachment portions 75 and then screwing these screws into the screw holes. Thus, the sheet-type heat pipe 1 can be easily attached and fixed to a desired location of the chassis of the mobile terminal 51.

Figure 41:
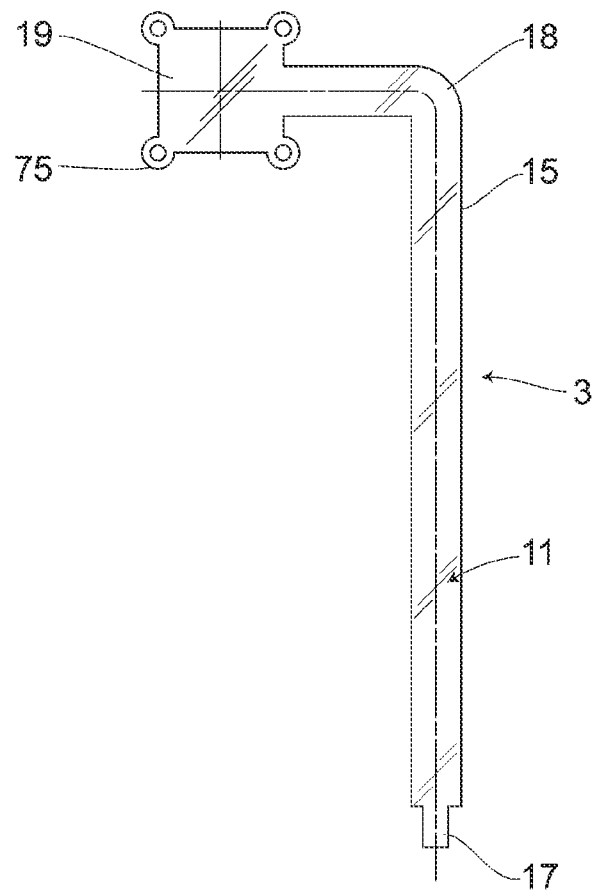
FIG. 41 is a planar view of a modified embodiment of the sheet-type heat pipe of the third embodiment.

FIG. 41 shows a modified embodiment of the sheet-type heat pipe 3 of the third embodiment. Here, formed on the four corners of the heat receiving portion 19 are the attachment portions 75 similar to those shown in FIG. 40. Particularly, in such case, the attachment portions 75 allow the heat receiving portion 19 of the sheet-type heat pipe 3 to tightly abut against the CPU 54 as the heat source.

The attachment portions 75 are not limited to those shown in FIG. 40 and FIG. 41. In fact, the attachment portions 75 may have any structures and be provided in any locations as long as the sheet-type heat pipe can thus be easily attached and fixed to the chassis of the mobile terminal 51.

Figure 42:
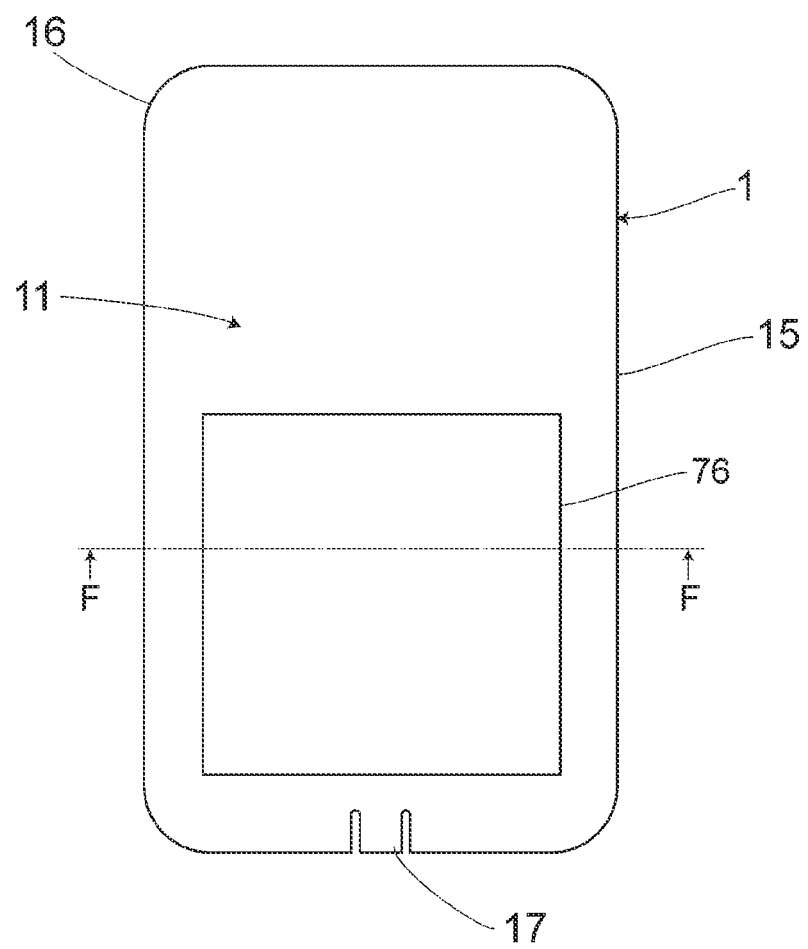
FIG. 42 is a planar view of a modified embodiment of the sheet-type heat pipe of the first embodiment.

FIG. 42 shows a modified embodiment of the sheet-type heat pipe 1 of the first embodiment. Here, the sheet-type heat pipe 1 includes an escape section 76 as a region interfering with the chassis of the mobile terminal 51. Particularly, the escape section 76 is provided to avoid an inference with the battery pack 57. For this reason, the sheet-type heat pipe 1 can be installed in the chassis of the mobile terminal 51 without causing the heat dissipation plate 60 to come into contact with the battery pack 57, thereby also making it possible to alleviate a heat influence inflicted upon the battery pack 57 by the sheet-type heat pipe 1. Other than the region of the battery pack 57, the aforementioned escape section may be provided in regions interfering with various functional components that are installed inside the chassis of the mobile terminal 51.

Figure 43:
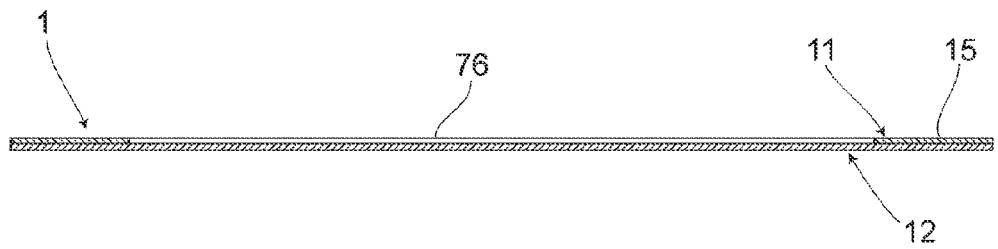
FIG. 43 is a cross-sectional view taken on a line F-F shown in FIG. 42, when the escape section is formed as a cutout or a thin-walled section.
Figure 44:
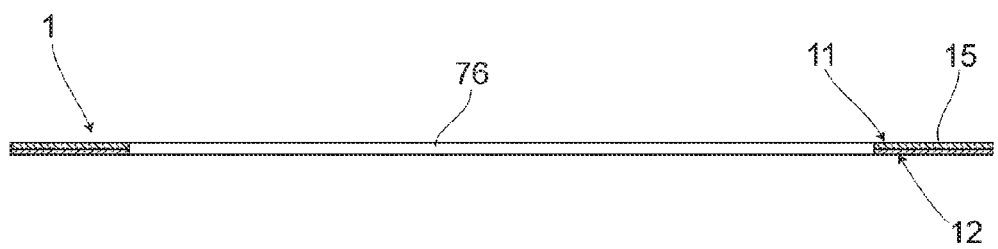
FIG. 44 is a cross-sectional view taken on the line F-F shown in FIG. 42, when the escape section is formed as a through hole.

FIG. 43 is a cross-sectional view taken on a line F-F of FIG. 42 when the escape section 76 is either a cutout or a thin-walled section. In addition, FIG. 44 is a cross-sectional view taken on the line F-F of FIG. 42 when the escape section 76 is formed as a through hole. That is, in accordance with the shapes of each functional component and the battery pack 57, the escape section 76 may be formed as a concave cutout or thin-walled section; or as a through hole. Moreover, the escape section 76 may also be formed in appropriate regions of the sheet-type heat pipes 1 and 3 when necessary.

Figure 45:
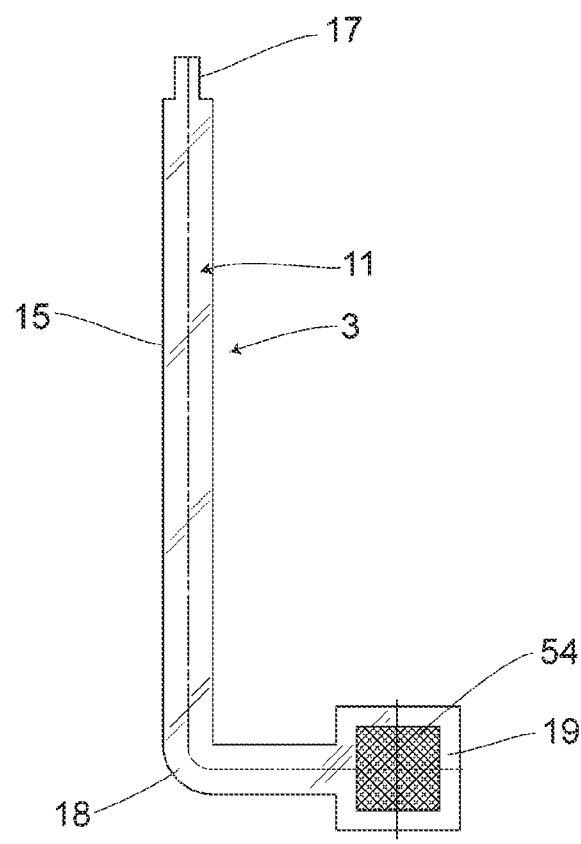
FIG. 45 is a planar view of the sheet-type heat pipe of the third embodiment, showing a positional relationship between a CPU and a heat receiving portion.

FIG. 45 shows a positional relationship between the heat receiving portion 19 and the CPU 54 with regard to the sheet-type heat pipe 3 of the third embodiment. The CPU 54 has a rectangular outer shape, and the heat receiving portion 19 is formed in such a manner that it matches the outer shape of the CPU 54. Particularly, it is preferred that the heat receiving portion 19 be formed into a shape allowing the entire surface of the CPU 54 to come into contact therewith.

Figure 46:
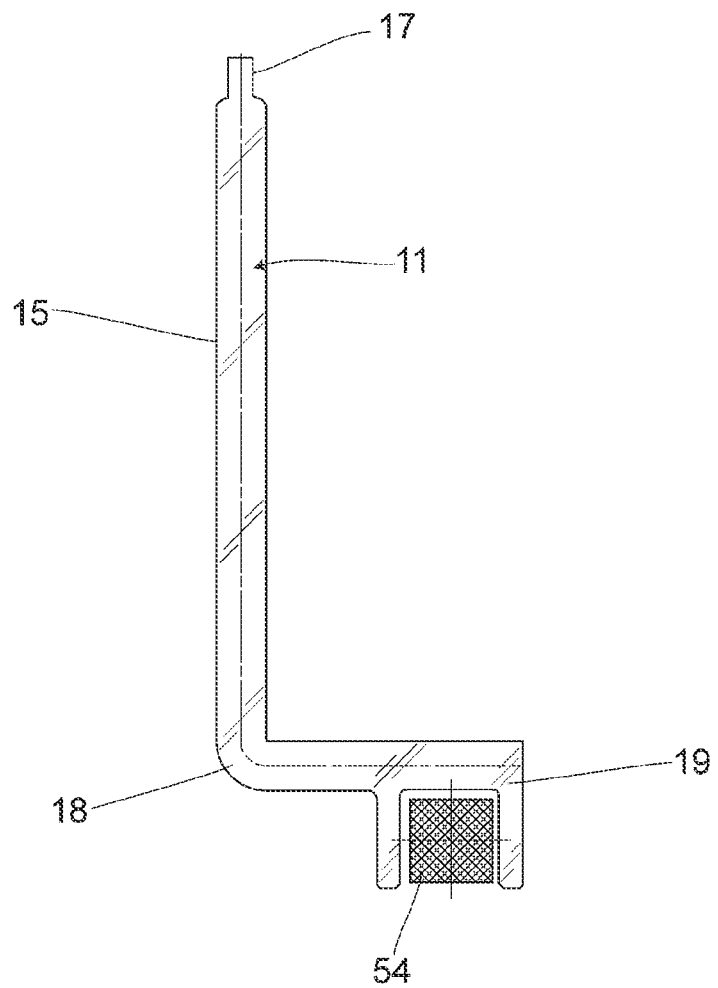
FIG. 46 is a planar view of a modified embodiment of the sheet-type heat pipe of the third embodiment, showing a positional relationship between a CPU and a heat receiving portion.

FIG. 46 shows a modified embodiment of the heat receiving portion 19 of the sheet-type heat pipe 3 of the third embodiment. Here, the heat receiving portion 19 is disposed in a lateral section of the CPU 54 as the heat source in a way such that this heat receiving portion 19 surrounds an area that occupies 50% of a peripheral region of the CPU 54. In this way, even when a limitation is imposed on the thickness of the chassis of the mobile terminal 51; and the heat receiving portion 19 and the CPU 54 cannot be vertically laid on top of each other, the heat receiving portion 19 of the sheet-type heat pipe 3 can be disposed in the lateral section of the CPU 54 that occupies at least 50% of the peripheral region of the CPU 54, thereby not only allowing the sheet-type heat pipe 3 to be received inside the thin chassis of the mobile terminal 51, but also allowing the heat from the CPU 54 to be thermally and effectively transported through the sheet-type heat pipe 3.

Figure 47:
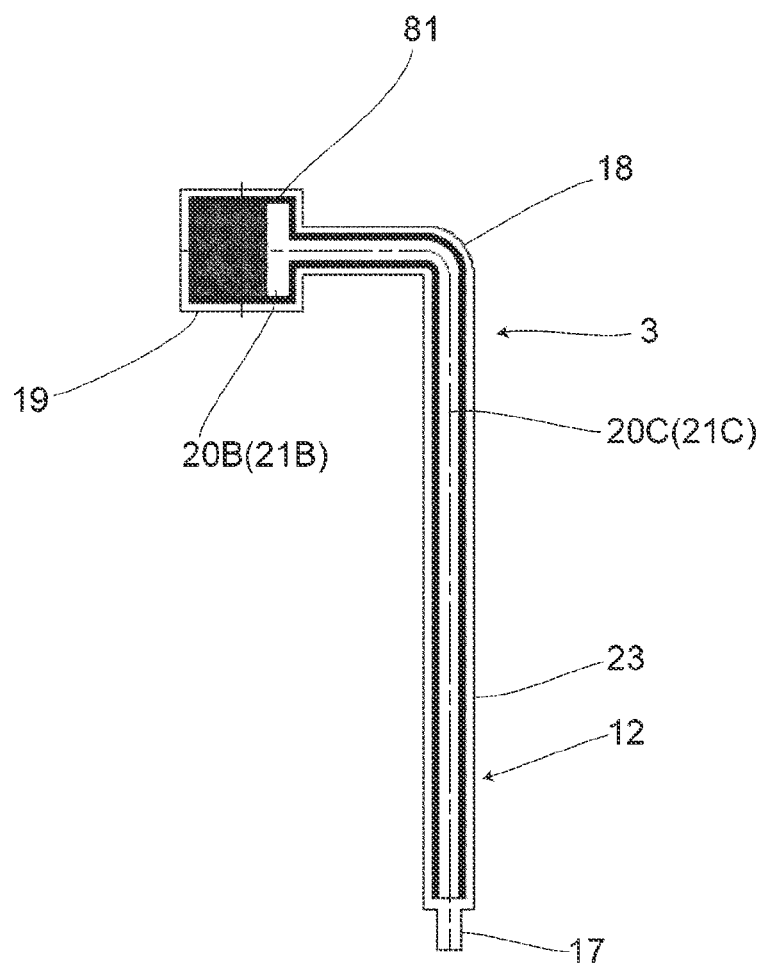
FIG. 47 is a planar view of a second sheet body with an unwoven cloth disposed therein, which is a modified embodiment of the sheet-type heat pipe of the first embodiment.
Figure 48:
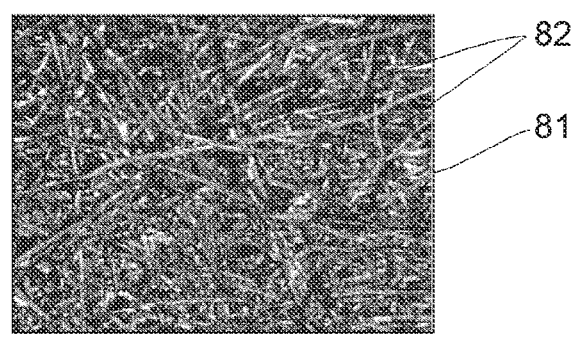
FIG. 48 is an enlarged view of the unwoven cloth shown in FIG. 47.

FIG. 47 shows a state in which a sheet-type unwoven cloth 81 is used to partially fill the heat receiving portion 19 and the container 15 with regard to the sheet-type heat pipe 3 of the third embodiment. The unwoven cloth 81 provided inside the container 15 is in fact arranged between the sheet bodies 11 and 12, and the wicks 22 formed in the heat receiving portion 19 are finely miniaturized even further due to the portion of the unwoven cloth 81 filled therein. FIG. 48 is an enlarged view of the unwoven cloth 81 shown in FIG. 47. The unwoven cloth 81 is made of an aggregate of a metal fiber 82, and has a clearance not larger than 30 μm for the purpose of improving the capillary force of the wicks 22 of the heat receiving portion 19. That is, as for the heat receiving portion 19, other than the capillary force of the grooves 22 formed on both sides of the vapor passage 20, the capillary force of the unwoven cloth 81 made of the metal fiber 82 also comes into effect such that the operating fluid can be swiftly refluxed to the heat receiving portion 31, thereby efficiently drawing the heat from the CPU 54, thus improving the performance of the sheet-type heat pipe 3.

As described above, as for each of the sheet-type heat pipes 1, 2, 3 and 4 of the aforementioned embodiments, not less than two of the sheet bodies 11, 12 and 13 as the etched metal sheets are laid on top of each other, and the sealed container 15 having the thickness t1 of not larger than 0.5 mm is formed by, for example, diffusion-joining a part of the outer circumferential portion except at least the sealing portion 17 for welding.

In this case, although the thickness t1 of the sealed container 15 is formed as small as 0.5 mm or smaller as a result of etching the one or both side surfaces of the sheet bodies 11, 12 and 13 and then joining a part of the outer circumferential portion except at least the sealing portion 17, the fine concavities and convexities formed inside the container 15 allows there to be obtained the thin sheet-type heat pipes 1, 2, 3 and 4 with a sufficient heat transport capability. Further, the small thickness of the container 15 allows each of the sheet-type heat pipes 1, 2, 3 and 4 of the present embodiments to be effortlessly installed in a thin chassis such as that of the mobile terminal 51.

In addition, each of the sheet bodies 11 and 12 has the thickness t2 within the range of 0.05 mm to 0.3 mm, and the sheet body 13 has the thickness t3 also within the range of 0.05 mm to 0.3 mm. Moreover, the wicks 22 composed of the vapor passage 20 and the grooves 26 are formed through etching. Each of the sheet-type heat pipes 1, 2, 3 and 4 has the structure obtained by selectively laying these sheet bodies 11, 12 and 13 on top of each other and then diffusion-joining the same.

In this case, the fine vapor passage 20 and wicks 22 having a sufficient heat transport capability can be formed on the inner surface of the container 15 by performing etching on the one side surfaces of the sheet bodies 11 and 12 each having the thickness t2 of 0.05 mm to 0.3 mm or on both the front and rear surfaces of the sheet body 13 having the thickness t3 of 0.05 mm to 0.3 mm. Further, when stacking and joining together the sheet bodies 11, 12 each having the thickness t2 of 0.05 mm to 0.3 mm, preferably 0.1 mm to 0.2 mm; and the sheet body 13 having a similar thickness t3, a manufacturability can be improved by particularly performing diffusion joining.

Further, as for each of the sheet-type heat pipes 1, 2 and 3 of the embodiments, there is employed the structure in which only the two sheet bodies 11 and 12 compose the sheet pipe; the wicks 22 made of the vapor passage 20 and the grooves 26 are formed on each of the sheet bodies 11 and 12 through half-etching; and these sheet bodies 11 and 12 are in fact laid on top of and joined to each other.

In this case, since half-etching is performed on the one side surfaces of the sheet bodies 11 and 12, there can be formed on the inner surface of the container 15 the fine vapor passage 20 and wicks 22 having sufficient heat transport capabilities. Further, since only two metal sheets are employed, not only a high reliability can be achieved in the joined section, but the thickness of the container 15 can be easily formed to 0.5 mm or smaller.

Moreover, as for each of the sheet bodies 11 and 12 of the embodiments, formed through etching are the grooves 26 that are composed of the vapor passage 20 and the wicks 22. These grooves 26 include the first grooves 26A that are formed on both sides of and orthogonal to the vapor passage 20; and the second grooves 26B that are also orthogonal to the vapor passage 20, but are formed more distant therefrom than the first grooves 26A. Particularly, the number of the first grooves 26A provided is larger than that of the second grooves 26B.

In this case, the vapor passage 20 becomes narrow as a result of extremely thinning the container 15 to the thickness t1 of 0.5 mm or smaller. However, the performance of each of the sheet-type heat pipes 1, 2, 3 and 4 can be improved by forming the fine first grooves 26A on both sides of the vapor passage 20 in a manner such that the operating fluid such as water condensed inside the container 15 does not clog the vapor passage 20; and finely making the number of the first grooves 26A larger than that of the second grooves 26B such that the absorption capability (capillary force) of the first grooves 26A to absorb the operating fluid can be improved.

Further, as for the sheet bodies 11 and 12 of the embodiments, there are formed, through etching, the grooves 26 as the wicks 22. Particularly, the grooves 26 formed on the first sheet body 11 and the grooves 26 formed on the second sheet body 12 are to be arranged in the staggered manner against one another when laying these sheet bodies 11 and 12 on top of each other.

In this case, since the grooves 26 formed on the first sheet body 11 and the grooves 26 formed on the second sheet body 12 are arranged in the staggered manner against one another, the wicks 22 can be finely miniaturized such that the capillary force thereof can be improved, thereby improving the performances of the sheet-type heat pipes 1, 2, 3 and 4.

Further, the grooves 26 as the wicks 22 are formed on the sheet bodies 11 and 12 of the embodiments through etching. Particularly, the opening sections of the grooves 26 formed on the first sheet body 11 are to be blocked by the walls 27 of the second sheet body 12.

In this case, by allowing the walls 27 of the second sheet body 12 to block the opening sections of the grooves 26 formed on the first sheet body 11, the wicks 22 can be finely miniaturized such that the capillary force thereof can be improved, thereby improving the performances of the sheet-type heat pipes 1, 2, 3 and 4.

Further, the outer circumferential portion of the container 15 of the embodiments is formed by diffusion-joining together the side walls 23 of, for example, the sheet bodies 11, 12 and 13. Particularly, the width d4 of each side wall 23 is formed to not smaller than 0.3 mm.

In this case, the width d4 of the side wall 23 of each of the sheet bodies 11, 12 and 13 forming the outer circumferential portion of the container 15 is formed to a thickness of at least 0.3 mm or larger, thereby allowing diffusion joining to be performed in a favorable manner, thus making it possible to provide the sheet-type heat pipes 1, 2, 3 and 4 with a high reliability in sealing the container 15.

Further, as for the sheet bodies 11 and 12 of the embodiments, there are formed, through etching, the grooves 26 and walls 27 serving the wicks 22. Particularly, the walls 27 are composed of the plurality of the first walls 27A each having the width d2 of smaller than 0.25 mm; and the plurality of the second walls 27B each having the width d3 of not smaller than 0.25 mm. These sheet bodies 11 and 12 are to be laid on top of and then diffusion-joined to each other.

In this case, since the second walls 27B having the width d3 of not smaller than 0.25 mm are formed as a part of the wicks 22, the second walls 27B can be utilized to diffusion-join the sheet bodies 11 and 12 at where the wicks 22 are provided, thus even allowing each of the thin sheet-type heat pipes 1, 2 and 3 to maintain a sufficient strength.

Further, as for the sheet bodies 11 and 12 of the embodiments, the grooves 26 serving as the wicks 22 are formed through etching. Particularly, the width d1 of each of the grooves 26 is formed to 0.05 mm to 0.3 mm.

In this case, since the width d1 of the grooves 26 serving as the wicks 22 is formed to 0.05 mm to 0.3 mm, the capillary force of the wicks 22 can be improved, thus improving the performances of the sheet-type heat pipes 1, 2, 3 and 4.

Further, as for the sheet bodies 11 and 12 of the embodiments, the vapor passage 20 and the wicks 22 are formed through etching. Particularly, as for the sheet-type heat pipe 1 of the first embodiment, the vapor passage 20 thereof is so established that the plurality of the first vapor paths 20A are communicated with the one or plurality of the second vapor paths 20B.

In this case, since the first vapor paths 20A and the second vapor path(s) 20B are individually communicated with one another, a thermal uniformity can be achieved in the entire area of the sheet-type heat pipe 1 regardless of where the heat receiving portion and the heat dissipation portion are located on the sheet-type heat pipe 1.

Further, in the aforementioned embodiments, each of the thin sheet-type heat pipes 1, 2, 3 and 4 is to be installed inside the chassis of the mobile terminal 51 such as a smartphone.

In this case, each of the thin sheet-type heat pipes 1, 2, 3 and 4 can be installed inside the thin chassis of the mobile terminal 51, thereby allowing heat diffusion to favorably take place in a wide region of the chassis, thus allowing a heat-generating component such as the CPU 54 to sufficiently deliver its performance.

Further, as for the chassis of the mobile terminal 51 of the embodiments, the touch panel 53 as a touchable display is provided on one side thereof, and the sheet-type heat pipe 1 is installed in the region occupying not less than 50% of the metal plate 59 as the rear surface of the touch panel 53.

In this case, since the heat transported by the sheet-type heat pipe 1 is swiftly diffused in a wide region of the chassis of the mobile terminal 51, a favorable heat diffusion can take place in approximately the entire region of the chassis. For this reason, a heat-generating component such as the CPU 54 can sufficiently deliver its performance while alleviating the heat spot(s) occurring on the touch panel 53.

Further, it is preferred that the attachment portions 75 such as the through holes be formed on each of the sheet-type heat pipes 1, 2, 3 and 4 of the embodiments such that each sheet-type heat pipe can be attached to the chassis.

In this case, since the attachment portions 75 allowing each sheet-type heat pipe to be attached to the chassis are formed on each of the sheet-type heat pipes 1, 2, 3 and 4, the attachment portions 75 can be utilized to easily attach each of the sheet-type heat pipes 1, 2, 3 and 4 to the chassis.

Further, each of the sheet-type heat pipes 1, 2, 3 and 4 of the embodiments may include a through hole, cutout or thin-walled section as the escape section 76 for the battery pack 57 or a functional component.

In this case, each of the sheet-type heat pipes 1, 2, 3 and 4 can be easily installed inside the chassis without interfering with the battery pack 57 or a functional component, thus making it possible to easily thin the mobile terminal 51.

Further, as for the mobile terminal 51 of the embodiments, the heat dissipation plate 60 thermally connected to each of the sheet-type heat pipes 2, 3 and 4 is installed inside the chassis.

In this case, the heat dissipation plate 60 allows heat diffusion to favorably take place inside the chassis regardless of the shape of each of the sheet-type heat pipes 2, 3 and 4, thus leading to an improvement in the performance of a heat-generating component such as the CPU 54.

Particularly, as for the sheet-type heat pipe 3 of the third embodiment, the heat receiving portion 19 thereof is disposed in the lateral section of the CPU 54 as the heat source in the way such that this heat receiving portion 19 surrounds the area that occupies 50% or more of the peripheral region of the CPU 54.

In this case, the heat receiving portion 19 of the sheet-type heat pipe 3 is disposed in the lateral section of the CPU 54 that occupies at least 50% of the peripheral region of the CPU 54, thereby allowing the heat from the CPU 54 to be thermally and effectively transported by the sheet-type heat pipe 3. In this way, a favorable heat diffusion is allowed to take place inside the chassis, thus leading to an improvement in the performance of a heat-generating component such as the CPU 54.

Further, it is preferred that the thickness t1 of each of the sheet-type heat pipes 1, 2, 3 and 4 installed in the mobile terminal 51 be formed to not larger than 0.5 mm.

In this case, if the thickness t1 of each of the sheet-type heat pipes 1, 2, 3 and 4 is formed to not larger than 0.5 mm, each of these sheet-type heat pipes can be installed in the chassis of the thinner mobile terminal 51, thus making it possible to easily make the mobile terminal thinner.

Further, as for the sheet-type heat pipe 3 of the third embodiment, for example, not less than two etched sheet bodies 11 and 12 are laid on top of and joined to each other to form the sealed container 15. Particularly, the unwoven cloth 81 made of the metal fiber 82 is used to fill the portion of the container 15 that serves as the heat receiving portion 19.

In this case, by etching the surfaces of the sheet bodies 11 and 12, there can be obtained the thin sheet-type heat pipe 3 with a sufficient heat transport capability and with the fine concavities and convexities formed on the inner surface of the container 15, even when the thickness of the sealed container is as thin as, for example, 0.5 mm or thinner. Further, as for the wicks 22 of the heat receiving portion 19 as a part of the container 15, the unwoven cloth 81 loaded therein allows the wicks 22 to be finely miniaturized, thus leading to an improvement in the performance of the sheet-type heat pipe 3.

Further, the vapor passage 20 and the grooves 26 as the wicks 22 are formed on each of the sheet bodies 11 and 12 through half-etching. Particularly, the sealed container 15 having the thickness t1 of not larger than 0.5 mm is formed by stacking and joining together these sheet bodies 11 and 12.

In this case, by performing half-etching on the surfaces of the sheet bodies 11 and 12, there can be formed on the inner surface of the container 15 the fine vapor passage 20 and wicks 22 having a sufficient heat transport capability. Further, since the thickness t1 of the container 15 is set to be not larger than 0.5 mm, the sheet-type heat pipe 3 can be effortlessly installed even in the thin chassis such as that of the mobile terminal 15.

Further, as for each one of the sheet-type heat pipes 1, 2, 3 and 4 of the embodiments, etching is performed on each of the sheet bodies 11 and 12 such that the passage section 21 as the ditched section of the vapor passage 20 is formed and has the thickness L1 that is not smaller than 50% of the thickness t2 of each sheet body.

In this case, since there is formed, through etching, the passage section 21 as the ditched section of the vapor passage 20 that has the thickness L not smaller than 50% of the thickness t2 of each of the sheet bodies 11 and 12, even each of the thin sheet-type heat pipes 1, 2, 3 and 4 can allow an adequate vapor passage to be secured inside the container 15, thus leading to an improvement in the performance of each of the sheet-type heat pipes 1, 2, 3 and 4.

Further, as for each one of the sheet-type heat pipes 1, 2, 3 and 4 of the embodiments, etching is performed on each of the sheet bodies 11 and 12 such that the ditched depth L of the vapor passage 20 is formed larger than the ditched depth L2 of the grooves 26 as the wicks 22.

In this case, etching is performed on each of the sheet bodies 11 and 12 in a manner such that the ditched depth L1 of the passage section 21 as the vapor passage 20 becomes larger than the ditched depth L2 of the grooves 26 as the wicks 22. For this reason, even each of the thin sheet-type heat pipes 1, 2, 3 and 4 can allow an adequate vapor passage to be secured inside the container 15 and the fine wicks to be formed, thus leading to an improvement in the performance of each of the sheet-type heat pipes 1, 2, 3 and 4.

However, the present invention is not limited to the aforementioned embodiments. In fact, various modified embodiments are feasible within the scope of the present invention. For example, in the aforementioned embodiments, although the sheet bodies 11 and 12; or the sheet bodies 11, 12 and 13 are diffusion-joined together, there may be employed an other joining method such as ultrasonic joining. Further, one or multiple features shown in FIG. 29 to FIG. 48 may be incorporated into each of the sheet-type heat pipes 1, 2, 3 and 4 of the first embodiment to the fourth embodiment. Furthermore, the sheet-type heat pipe of the present invention may actually be formed into any shape as long as the desired performance thereof can be achieved.

What is claimed:

1. A sheet-type heat pipe comprising: at least two metal sheets including a first metal sheet and a second metal sheet; and a container that is formed by stacking together said metal sheets and is sealed by providing joints on at least a part of an outer circumferential portion thereof, wherein one of said metal sheets that serves as one of the outermost layers includes, on one side surface thereof, a vapor passage and grooves as wicks in a manner that said vapor passage does not overlap said grooves in a thickness direction of the container throughout the container in a planar view, said grooves comprising: first grooves that are arranged at a given interval and orthogonal to a side region of said vapor passage; and second grooves that are arranged at an interval larger than that of said first grooves and more distant from said vapor passage than said first grooves, said second grooves being outnumbered by said first grooves.

2. The sheet-type heat pipe according to claim 1, wherein said metal sheets are formed to a thickness of 0.05 mm to 0.3 mm.

3. The sheet-type heat pipe according to claim 1, wherein said grooves as wicks that are formed on said first metal sheet that serves as one of the outermost layers and forms one side surface of said container, and said grooves as wicks that are formed on said second metal sheet that serves as the other of the outermost layers and forms the other side surface of said container, are arranged in a staggered manner against one another so that said grooves formed on said first surface may not overlap said grooves formed on said second surface.

4. The sheet-type heat pipe according to claim 1, wherein opening sections of said grooves as wicks that are formed on said first metal sheet that serves as one of the outermost layers and forms one side surface of said container, are blocked by said second metal sheet that serves as the other of the outermost layers and forms the other side surface of said container.

5. The sheet-type heat pipe according to claim 1, wherein the outer circumferential portion of said container is formed by providing said joints on side walls of said metal sheets together, said side walls being formed to a width of not smaller than 0.3 mm.

6. The sheet-type heat pipe according to claim 1, wherein one side surface of each of said metal sheets, that serve as the outermost layers and form the both side surfaces of said container, includes walls as wicks, said walls comprising: a plurality of first walls having a width of smaller than 0.25 mm; and a plurality of second walls having a width of not smaller than 0.25 mm.

7. The sheet-type heat pipe according to claim 1, wherein said grooves are formed to a width of 0.05 mm to 0.3 mm.

8. The sheet-type heat pipe according to claim 1, wherein said vapor passage comprises a plurality of first vapor paths; and one or a plurality of second vapor paths that are communicated with said first vapor paths.

9. A mobile terminal comprising the sheet-type heat pipe as set forth in claim 1, said sheet-type heat pipe being installed inside a chassis of said mobile terminal.

10. The mobile terminal according to claim 9, wherein said chassis includes a touch panel; and said sheet-type heat pipe is installed in a region occupying not less than 50% of a rear surface of said touch panel.

11. The mobile terminal according to claim 9, wherein said sheet-type heat pipe includes at least one attachment portion such as a through hole allowing said sheet-type heat pipe to be attached to said chassis.

12. The mobile terminal according to claim 9, wherein said sheet-type heat pipe includes a through hole, a cutout or a thin-walled section serving as at least one escape section for a battery pack or a functional component.

13. The mobile terminal according to claim 9, wherein said sheet-type heat pipe is thermally connected to a heat dissipation plate that is installed inside said chassis.

14. The mobile terminal according to claim 9, wherein said sheet-type heat pipe includes at least one heat receiving portion disposed in a lateral section of a heat source such as a CPU in a way such that said heat receiving portion occupies not less than 50% of a peripheral region of the heat source.

15. The mobile terminal according to claim 9, wherein said sheet-type heat pipe is formed to a thickness of not larger than 0.5 mm.

16. The sheet-type heat pipe according to claim 1, wherein said container as a heat receiving portion is partially filled with an unwoven cloth made of a metal fiber.

17. The sheet-type heat pipe according to claim 16, wherein said sealed container is formed to a thickness of not larger than 0.5 mm.

18. The sheet-type heat pipe according to claim 1, wherein said metal sheets include a ditched section as the vapor passage that is formed and has a depth not smaller than 50% of a thickness of said metal sheets.

19. The sheet-type heat pipe according to claim 1, wherein said metal sheets are so configured that a ditched depth of the vapor passage is formed larger than a ditched depth of grooves as the wicks.

20. The sheet-type heat pipe according to claim 1, wherein said grooves as wicks further comprise third grooves that serve to communicate said first grooves and said second grooves with one another along the direction of said vapor passage, wherein first fluid passages are established by allowing said first metal sheet that serves as one of the outermost layers and forms one side surface of said container to block said opening sections of said first grooves formed on said second metal sheet that serves as the other of the outermost layers and forms the other side surface of said container, second fluid passages are established by allowing said third grooves formed on said first metal sheet and said third grooves formed on said second metal sheet to face to one another, and said second fluid passage is formed to have a larger cross-sectional area than that of said first fluid passage.

* * * * *